US011302310B1

(12) United States Patent
Gandhe et al.

(10) Patent No.: US 11,302,310 B1
(45) Date of Patent: Apr. 12, 2022

(54) LANGUAGE MODEL ADAPTATION

(71) Applicant: Amazon Technologies, Inc., Seattle, WA (US)

(72) Inventors: Ankur Gandhe, Bothell, WA (US); Ariya Rastrow, Seattle, WA (US); Roland Maximilian Rolf Maas, Seattle, WA (US); Bjorn Hoffmeister, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 295 days.

(21) Appl. No.: 16/426,557

(22) Filed: May 30, 2019

(51) Int. Cl.
*G10L 15/01* (2013.01)
*G10L 15/065* (2013.01)
*G10L 15/06* (2013.01)

(52) U.S. Cl.
CPC ............ *G10L 15/065* (2013.01); *G10L 15/01* (2013.01); *G10L 15/063* (2013.01)

(58) Field of Classification Search
CPC . G10L 15/1815; G10L 15/063; G10L 15/065; G10L 15/01
See application file for complete search history.

(56) References Cited

U.S. PATENT DOCUMENTS

| | | | | |
|---|---|---|---|---|
| 9,865,254 B1* | 1/2018 | Filimonov | ......... | G10L 15/1822 |
| 9,934,777 B1* | 4/2018 | Joseph | .................. | G10L 15/063 |
| 9,966,065 B2* | 5/2018 | Gruber | ................. | G06F 40/205 |
| 10,388,272 B1* | 8/2019 | Thomson | .............. | G10L 15/063 |
| 2005/0033709 A1* | 2/2005 | Meng | ....................... | G06N 3/08 706/25 |
| 2013/0185311 A1* | 7/2013 | MacMillan | ........ | G06Q 30/0201 707/748 |
| 2014/0180689 A1* | 6/2014 | Kim | ....................... | G10L 15/32 704/246 |
| 2016/0098393 A1* | 4/2016 | Hebert | ................ | G06F 16/3344 704/9 |
| 2018/0054506 A1* | 2/2018 | Hart | ...................... | H04M 1/271 |
| 2018/0197531 A1* | 7/2018 | Baughman | ............ | G10L 15/183 |
| 2019/0034795 A1* | 1/2019 | Zitouni | ............. | G06F 16/90335 |
| 2020/0327884 A1* | 10/2020 | Bui | ...................... | G06N 3/0454 |
| 2021/0042372 A1* | 2/2021 | Huang | ................ | G06F 16/9538 |

OTHER PUBLICATIONS

Auli, Michael, et al., "Joint Language and Translation Modeling with Recurrent Neural Networks", Proceedings of the 2013 Conference on Empirical Methods in Natural Language Processing, Oct. 2013, pp. 1044-1054.

(Continued)

*Primary Examiner* — Jakieda R Jackson
(74) *Attorney, Agent, or Firm* — Pierce Atwood LLP

(57) ABSTRACT

Exemplary embodiments relate to adapting a generic language model during runtime using domain-specific language model data. The system performs an audio frame-level analysis, to determine if the utterance corresponds to a particular domain and whether the ASR hypothesis needs to be rescored. The system processes, using a trained classifier, the ASR hypothesis (a partial hypothesis) generated for the audio data processed so far. The system determines whether to rescore the hypothesis after every few audio frames (representing a word in the utterance) are processed by the speech recognition system.

20 Claims, 20 Drawing Sheets

(56) References Cited

OTHER PUBLICATIONS

Gildea, Daniel, et al., "Topic-based Language Models Using EM", Sixth European Conference on Speech Communication and Technology, 1999.

Hori, Takaaki, et al., "Fast On-The-Fly Composition for Weighted Finite-State Transducers in 1.8 Million-Word Vocabulary Continuous Speech Recognition", Eighth International Conference on Spoken Language Processing, Oct. 2004.

Hori, Takaaki, et al., "Minimum word error training of long short-term memory recurrent neural network language models for speech recognition", IEEE International Conference of Acoustics, Speech and Signal Processing (ICASSP), Mar. 2016, pp. 5990-5994.

Iyer, Rukmini, et al., "Modeling Long Distance Dependence in Language: Topic Mixtures vs. Dynamic Cache Models", IEEE Transactions on Speech and Audio Processing, 7(1), 1999, pp. 30-39.

Kneser, Reinhard, et al., "On the Dynamic Adaptation of Stochastic Language Models", 1993 IEEE International Conference on Acoustics, Speech, and Signal Processing, 2, Apr. 1993, pp. 586-589.

Kumar, Shankar, et al., "Lattice Rescoring Strategies for Long Short Term Memory Language Models in Speech Recognition", 2017 IEEE Automatic Speech Recognition and Understanding Workshop (ASRU), Nov. 15, 2017, pp. 165-172.

Mikolov, Tomas, et al. "Context Dependent Recurrent Neural Network Language Model", 2012 IEEE Spoken Language Technology Workshop (SLT), Dec. 2012, pp. 234-239.

Raju, Anirudh, et al., "Contextual Language Model Adaptation for Conversational Agents", arXiv preprint arXiv:1806.10215, Jun. 26, 2019.

Rosen-Zvi, Michal, et al., "The Author-Topic Model for Authors and Documents", Proceedings of the 20th Conference on Uncertainty in Artificial Intelligence, 2004, pp. 487-494.

Wessel, Frank, et al., "A Comparison of Dialogue-state Dependent Language Models", ESCA Tutorial and Research Workshop (ETRW) on Interactive Dialogue in Multi-Modal Systems, 1999.

\* cited by examiner

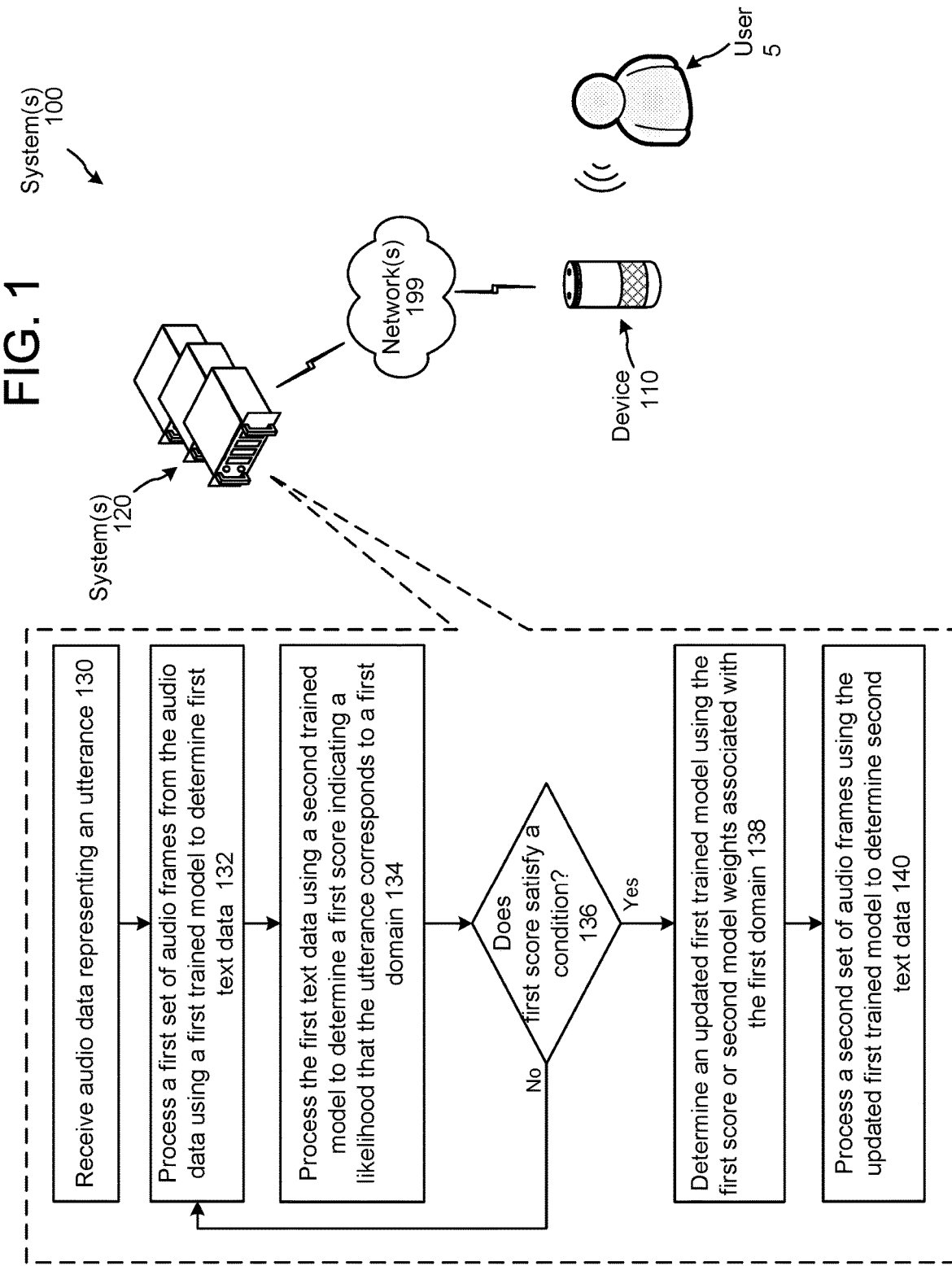

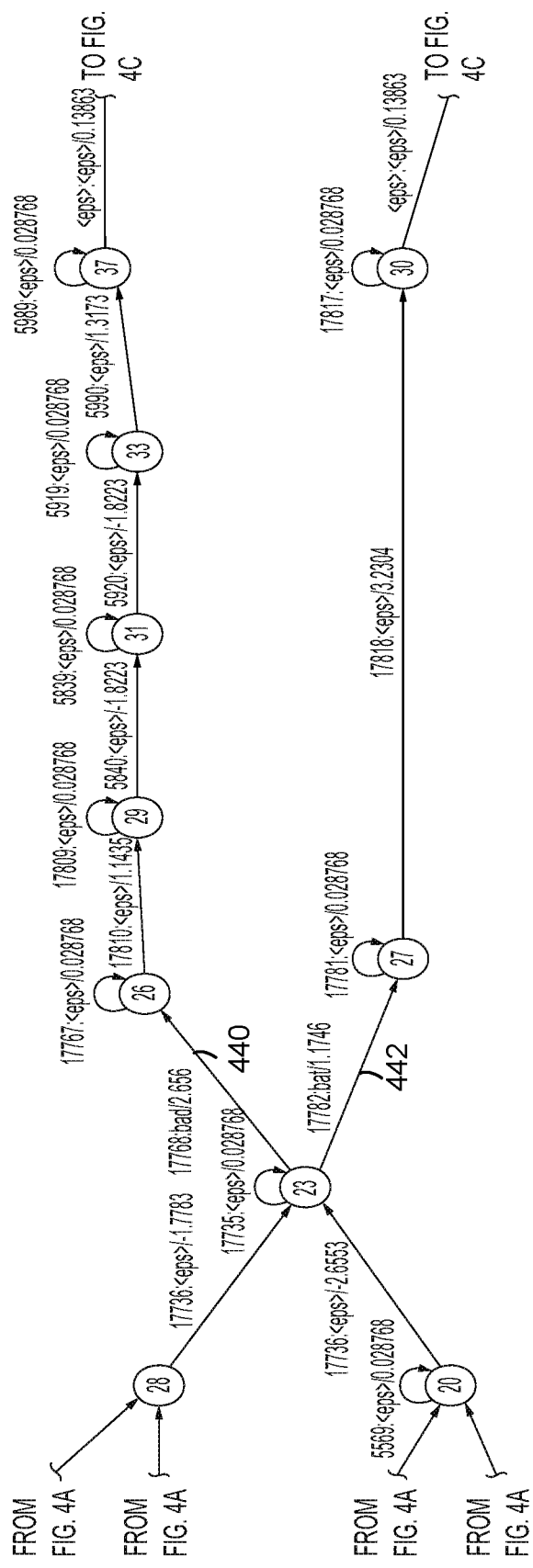

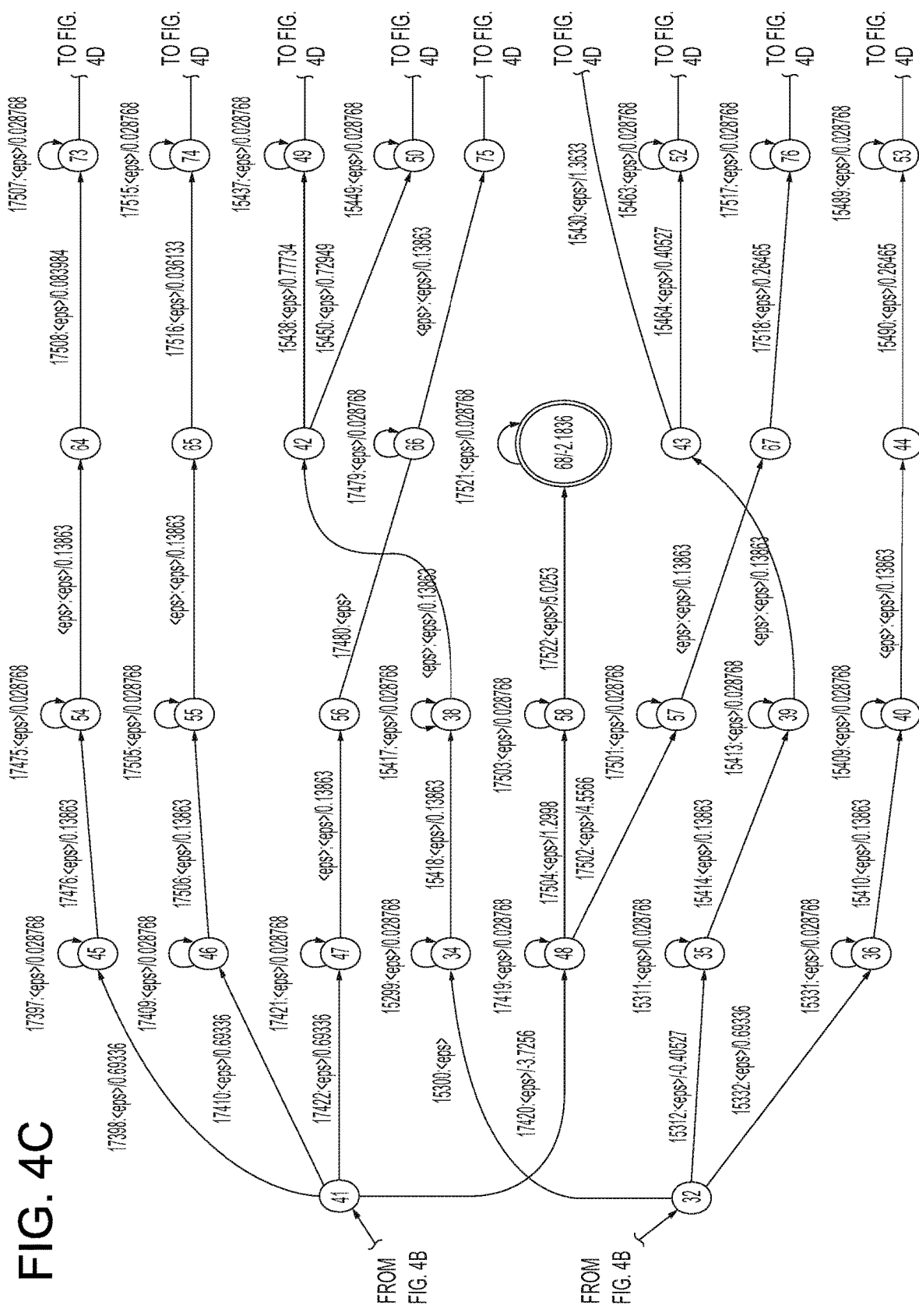

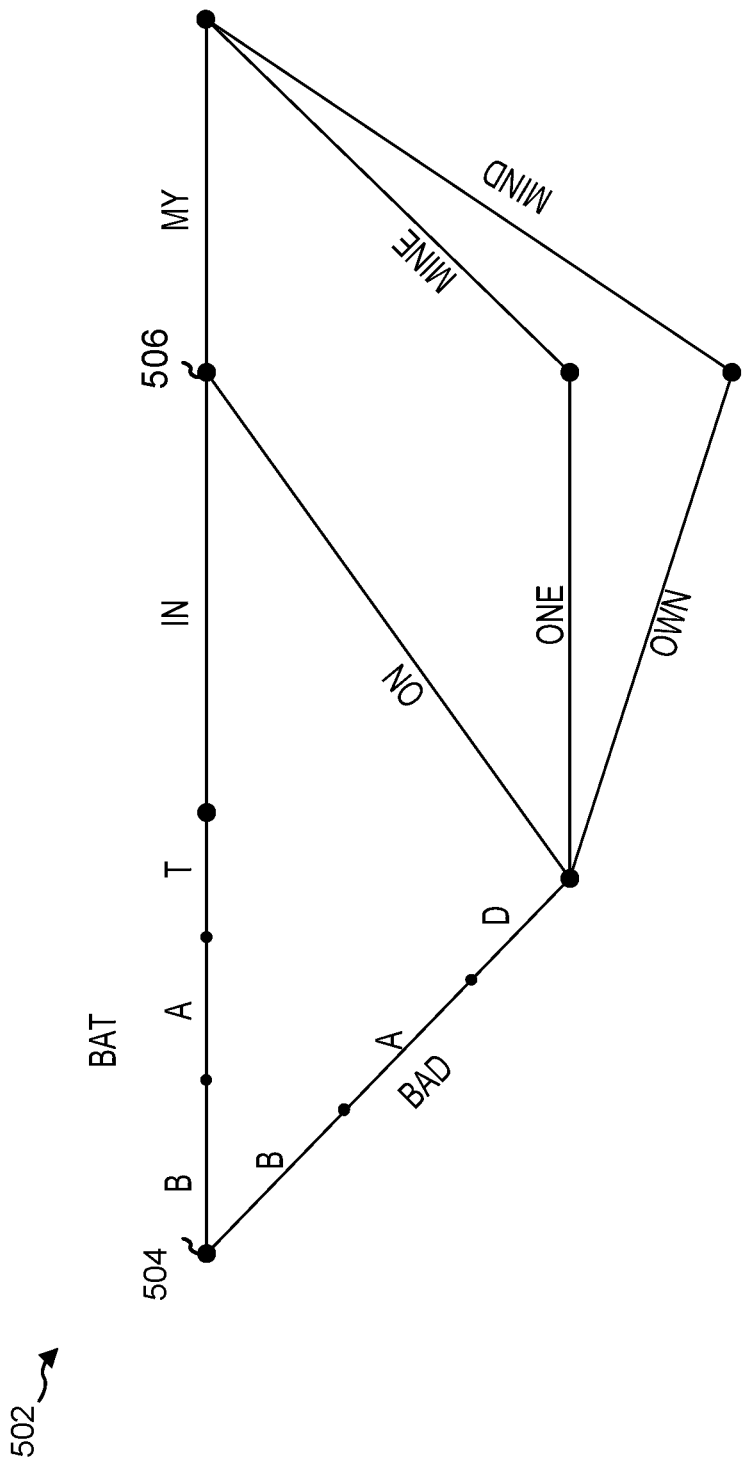

LANGUAGE MODEL ADAPTATION

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to adapt a language model for rescoring a speech processing system output according to embodiments of the present disclosure.

FIGS. 4A-4D illustrate a section of a finite state transducer according to embodiments of the present disclosure.

FIG. 5 illustrates a word lattice according to embodiments of the present disclosure.

DETAILED DESCRIPTION

Figure 2A:
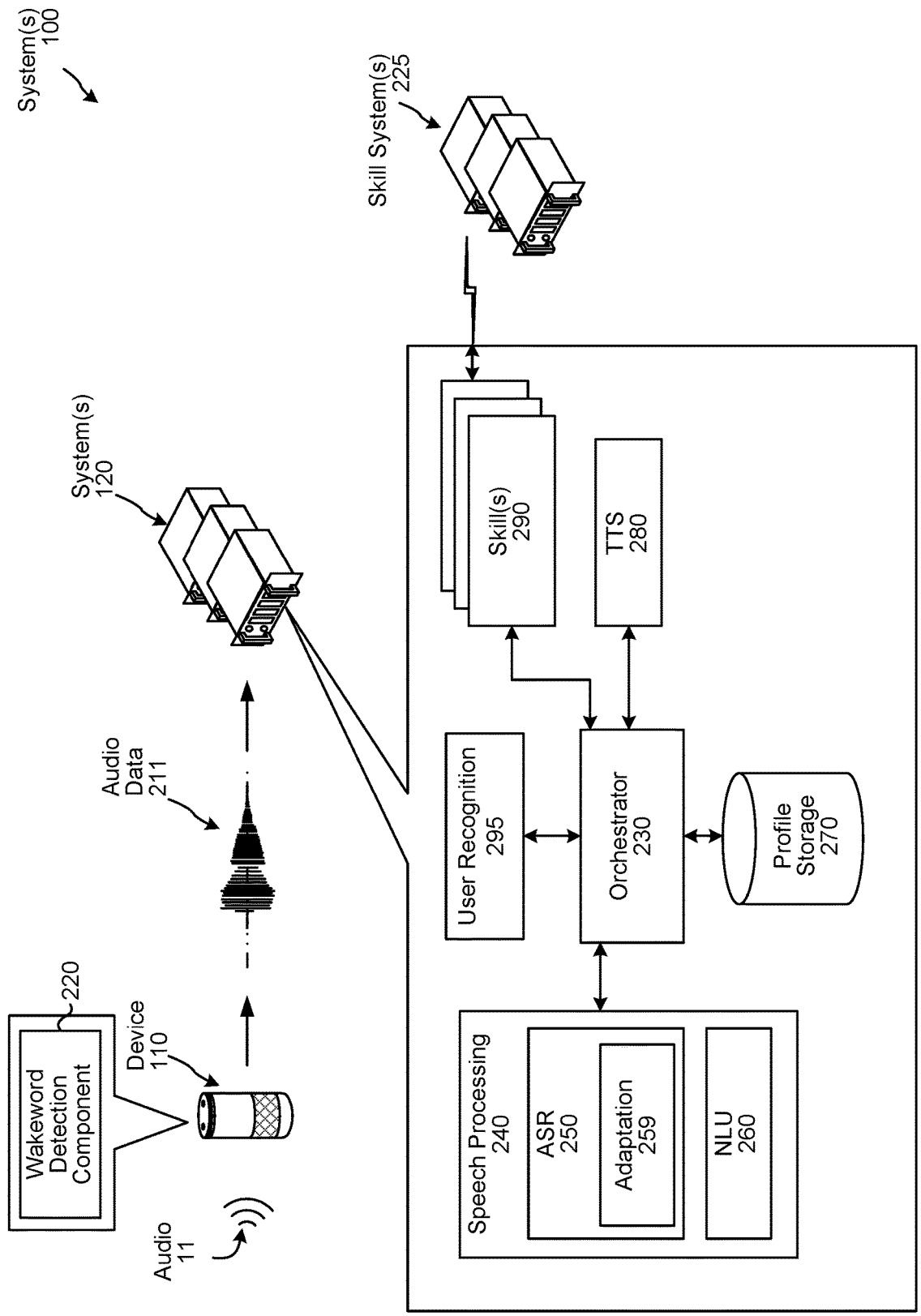
FIG. 2A is a conceptual diagram of speech processing components of a system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, though in certain systems speech processing may include only one of ASR or NLU (or another speech processing technique).

ASR and NLU can be computationally expensive. That is, significant computing resources may be needed to process ASR and NLU processing within a reasonable time frame. Because of this, a distributed computing environment may be used to when performing speech processing. An example of such a distributed environment may involve a local client device (e.g., a device in a same environment as a user and capable of capturing spoken commands from the user) having one or more microphones being configured to capture sounds from a user speaking (e.g., "utterances") and convert those sounds into data (e.g., "an audio signal"). The audio signal/data may then be sent to a downstream remote device for further processing, such as converting the audio signal into an ultimate command. The command may then be executed by a combination of remote and local devices depending on the command itself.

Finite State Transducers (FSTs) can be used in ASR systems to encode different knowledge sources (e.g., models) used during processing audio data. In certain aspects an FST may be used to model incoming sounds to words (e.g., an HCL FST, described below). In certain aspects an FST may be used to model words to sentences (e.g., a G FST, language model or grammar model described below). In certain aspects an FST may be used to model incoming sounds to sentences (e.g., an HCLG FST, described below). A language model is a model that indicates how likely certain words are used together, as based on many different example sentences and text available to the system. Such language models may encode a representation of how likely such words or word combinations are to be used by a speaker, thus assisting an ASR system in determining the likelihood that a certain word was spoken during an utterance that is being processed. Such language models are used with acoustic models to transform audio data into text. Acoustic models are used to determine a likelihood that a certain detected sound corresponds to a particular acoustic unit.

The size of transducers that include the language model functionality (such as a G FST or HCLG FST), may be proportional to the size of the respective language model(s) and thus may be large and require significant computing resources for training, storage, and operation. Such FST sizes may make it difficult to deploy more complex models or to efficiently update existing models during runtime (due to runtime resource restrictions). More complex models, however, often result in accuracy gains. Offered herein is, among other things, a system for dynamically adapting one or more language models during runtime as the system processes the audio data, thus allowing the system to emphasize (e.g., more heavily weight) portions of a language model that may be more relevant to an utterance in process and to deemphasize (e.g., reduce in weight) portions of a language model that may be less relevant to an utterance in process.

Language model adaptation for improving ASR may involve configuring a generic language model (that can process words relating to multiple domains) to focus on a specific domain based on information available for a given utterance or other type of user-device interaction. Some systems adapt language models by first using a language model to decode the input utterance, and then using the best ASR hypothesis to create another model for re-scoring the output produced by the language model initially. Using re-scoring in this manner results in computing overhead and causes latency in a speech processing system because the system waits to re-score until after the initial language model has completed its processing. The systems and methods described herein update the language model (to focus on a particular domain) during runtime after the language model has processed a portion of the input audio data, instead of delaying the adaptation of the language model until after it has processed the entire input audio data. In some cases, updating of the generic language model to focus on a particular domain is beneficial because the generic language model may not be optimal for determining ASR output corresponding to utterances that relate to certain domains. The generic language model may be updated using a domain-specific language model, which may correspond to certain words and phrases unique to a particular domain. As used herein, a "domain" may refer to a grouping of like functionality provided by a natural language processing system. The domain may include language model(s), statistical model(s), FST(s), and/or other types of models/data configured for the functionality(ies) provided by the domain. Example domains may include, but are not limited to, navigation, weather, shopping, messaging, smart home, music, video, flash briefing, and custom (e.g., functionality that is not associated with any pre-configured domain). As used herein, a generic language model may refer to a language model that is configured to recognize a large set of words relating to multiple domains. A domain-specific language model, as used herein, may refer to language models that are configured to recognize particular words associated with a specified domain. The system may train and store multiple language models, and select a particular domain-specific language model or model weights corresponding to a particular domain to update the generic language model based on the score outputted by the classifier, so that the updated generic language model is configured to focus on a particular domain.

The system described herein processes a partial ASR hypotheses (corresponding to a portion of the input audio data) using a trained classifier to determine a likelihood that the partial ASR hypotheses corresponds to one or more domains. The trained classifier leverages semantic information from the partial ASR hypotheses to determine if the utterance represented in the input audio data (that has been processed thus far) corresponds to a particular domain. For example, if the partial ASR hypotheses indicate that the word represented in the processed audio frames is "buy", then the classifier may determine that the corresponding domain is "shopping". As another example, if the partial ASR hypotheses indicate that the word is "play", then the classifier may determine that the corresponding domain is "media". Additionally, the classifier is configured to process multiple ASR hypotheses or the N-best list of partial hypotheses to ensure that a misidentified word in one of the hypothesis may be corrected by the classifier based on information derived from the other hypotheses. For example, the first best hypothesis may have misidentified the word buy as "by", however, the classifier may determine that the word is "buy" based on the other hypotheses in the N-best list identifying the word as "buy."

FIG. 1 illustrates a system 100 configured to update a language model during runtime for a speech processing system according to embodiments of the present disclosure. Although the figures and discussion illustrate certain operational steps of the system in a particular order, the steps described may be performed in a different order (as well as certain steps removed or added) without departing from the intent of the disclosure. As illustrated in FIG. 1, the system may include a device 110 local to a user 5, and one or more systems 120 connected across one or more networks 199. The system(s) 120 (which may be one or more different physical devices) may be capable of performing traditional speech processing (such as ASR, NLU, query parsing, etc.) as described herein. A single system may be capable of performing all speech processing or multiple systems 120 may combine to perform the speech processing. Further, the system(s) 120 may be configured to execute certain commands, such as answering queries spoken by user 5. In addition, certain speech detection or command execution functions may be performed by device 110.

The system(s) 120 receives (130) audio data represented an utterance. The audio data comprises of multiple audio frames. Each audio frame may be a window of 20 ms of audio, where the window slides or move in increments of 10 ms. The system(s) 120 processes (132) a first set of audio frames (e.g., 10 audio frames) from the audio data using a first trained model to determine first text data corresponding to the portion of the utterance represented in the first set of audio frames. The first trained model may be a language model configured to determine words represented in audio data as part of a speech recognition system. The first trained model includes first model weights. The first text data may represent an ASR hypothesis for the word represented in the first set of audio frames.

The system(s) 120 processes (134) the first text data using a second trained model to determine a first score indicating a likelihood that the utterance corresponds to a first domain. The second trained model may be a trained classifier. The first score may indicate the likelihood that the utterance corresponds to the first domain based on the portion of the utterance corresponding to the first set of audio frames that has been processed so far. The system(s) 120 determines (136) whether the score satisfies a condition, for example, the score may be above a threshold, the score may be below a threshold, there may be a change in the score from a previously determined score, and the like. If the score does not satisfy the condition, the system(s) 120 processes (132) more audio frames. If the score satisfies the condition, the system(s) 120 determines (138) an updated first trained model (e.g., updated trained model 914) using the first score or the second model weights associated with the first domain. The system(s) 120 processes (140) a second set of audio frames from the audio data using the updated first trained model to determine second text data corresponding to the second set of audio frames.

The system(s) 120 may perform operation 134 using the second text data. That is, the system(s) 120 processes the second text data using the second trained model to determine a second score indicating a likelihood that the utterance corresponds to a domain (e.g., the first domain or a second domain). The system(s) 120 may then determine (136) if the score satisfies a condition, determine (138) an updated first trained model using the second score or model weights associated with the domain, and process (140) the next set of audio frames (e.g., third set of audio frames) using the updated first trained model.

In this manner, the system(s) 120 updates the first trained model using information associated with a domain, where the domain is determined by processing a few audio frames using a second trained model. The system(s) 120 then uses the updated first trained model to process additional audio frames from the audio data. If there is a high likelihood that the audio data processed so far corresponds to a particular domain, then the system configures or adapts the first language model using data (language model weights, N-gram boosting, etc.) associated with the particular domain. In an example embodiment, the system may use the model weights and parameters associated with a domain-specific language model to update or configure the first language model to better recognize the remaining words (e.g., words that still need to be processed by the system) in the input utterance. In another embodiment, the system may use a domain-specific language model to rescore the N-best hypotheses generated by the generic language model.

In example embodiments, the generic language model and the domain-specific language models are finite state transducers (FSTs). In this case, the model weights of the language model may be referred to as "scores" associated with arcs and/or states in the FSTs.

In one embodiment, the system(s) 120 determines an updated first trained model using information associated with two domains. For example, the second trained model may determine a first score indicating a likelihood that the utterance corresponds to a first domain and a second score indicating a likelihood that the utterance corresponds to a second domain. The system(s) 120 may determine an updated first trained model using second model weights associated with the first domain and third model weights associated with the second domain.

In some embodiments, the first trained model is a FST and the model weights may be represented as data vectors. The model weights may be associated with multiple domains. For example, a weight data vector associated with a first state of the FST may comprise a first weight corresponding to a first domain and a second weight corresponding to a second domain. The second trained model may determine a probability data vector that comprises a first score indicating a likelihood that the utterance corresponds to the first domain and a second score indicating a likelihood that the utterance corresponds to the second domain. The system(s) 120 may determine the model weights for the updated first trained model using the weight data and the probability data vector, for example by multiplying the two data vectors.

In some embodiments where the first trained model is a FST, the system(s) 120 may boost (increase model weights) certain words represented in the first trained model. The second trained model may determine a set of words or word sequences (e.g., N-grams) associated with the first domain corresponding to the utterance, and the second model weights may correspond to the set of word sequences. For example, a first weight may correspond to a first word sequence. The system(s) 120 may determine a traversal path in the FST that corresponds to the first word sequence. The updated first trained model may be determined by multiplying the weight associated with the traversal path with the first weight determined by the second trained model. Thus the system(s) 120 boosts or increases model weights corresponding to certain words in the first trained model.

In another embodiment, the system(s) 120 processes another set of audio frames using the updated first trained model and the second trained model determines that the utterance corresponds to another domain. For example, the system(s) 120 may process a third set of audio frames using the second trained model to determine a second score indicating a likelihood that the utterance corresponds to a second domain based on processing of the audio frames so far. The system(s) 120 determines that the second score is above the threshold, and determines an additional updated first trained model using third model weights associated with the second domain. The system(s) 120 may then process the next set of audio frames of the audio data using the additional updated first trained model.

The overall system 100 of the present disclosure may operate using various components as illustrated in FIG. 2A. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection may be performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The text data output by the ASR component 250 may thus represent one or more (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 2330 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis, for example unit selection, the TTS component 280 matches text data against a database of recorded speech. The TTS component 280 selects matching units of recorded speech and concatenates the units together to form audio data. In another method of synthesis, for example parametric synthesis, the TTS component 280 varies parameters such as frequency, volume, and noise to create audio data including an artificial speech waveform. Parametric synthesis uses a computerized voice generator, for example a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 2B:
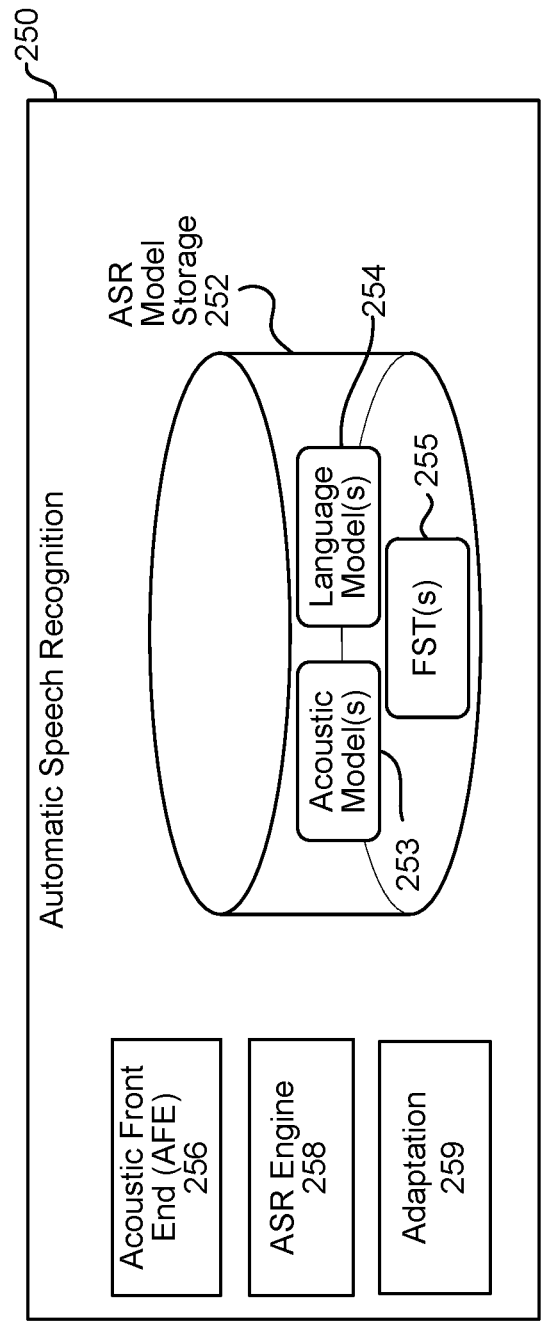
FIG. 2B is a conceptual diagram of automatic speech recognition (ASR) components of the system according to embodiments of the present disclosure.

FIG. 2B as illustrated shows specific components of the ASR component 250. As noted above, the ASR component 250 transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252. For example, the ASR process may compare the input audio data with models for sounds (e.g., subword units or phonemes) and sequences of sounds to identify words that match the sequence of sounds spoken in the utterance of the audio data. Alternatively, the ASR process may use a finite state transducer (FST) 255 to implement the language model functions, as explained below.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a ASR engine 258. The acoustic front end (AFE) 256 transforms the audio data from the microphone into data for processing by the speech recognition engine. The ASR engine 258 compares the speech recognition data with acoustic models 253, language models 254, FST 255, and/or other data models and information for recognizing the speech conveyed in the audio data. The AFE may reduce noise in the audio data and divide the digitized audio data into frames representing a time intervals for which the AFE determines a number of values, for example features, representing the qualities of the audio data, along with a set of those values, for example a feature vector, representing the features/qualities of the audio data within the frame. Audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, language models 254, and FST 255. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, shopping, navigation, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

As part of the ASR processing the ASR engine 258 may use acoustic model(s) 253 to attempt to match received audio feature vectors to words or acoustic units/subword units. An acoustic unit/subword unit may be a senon, phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

Figure 3:
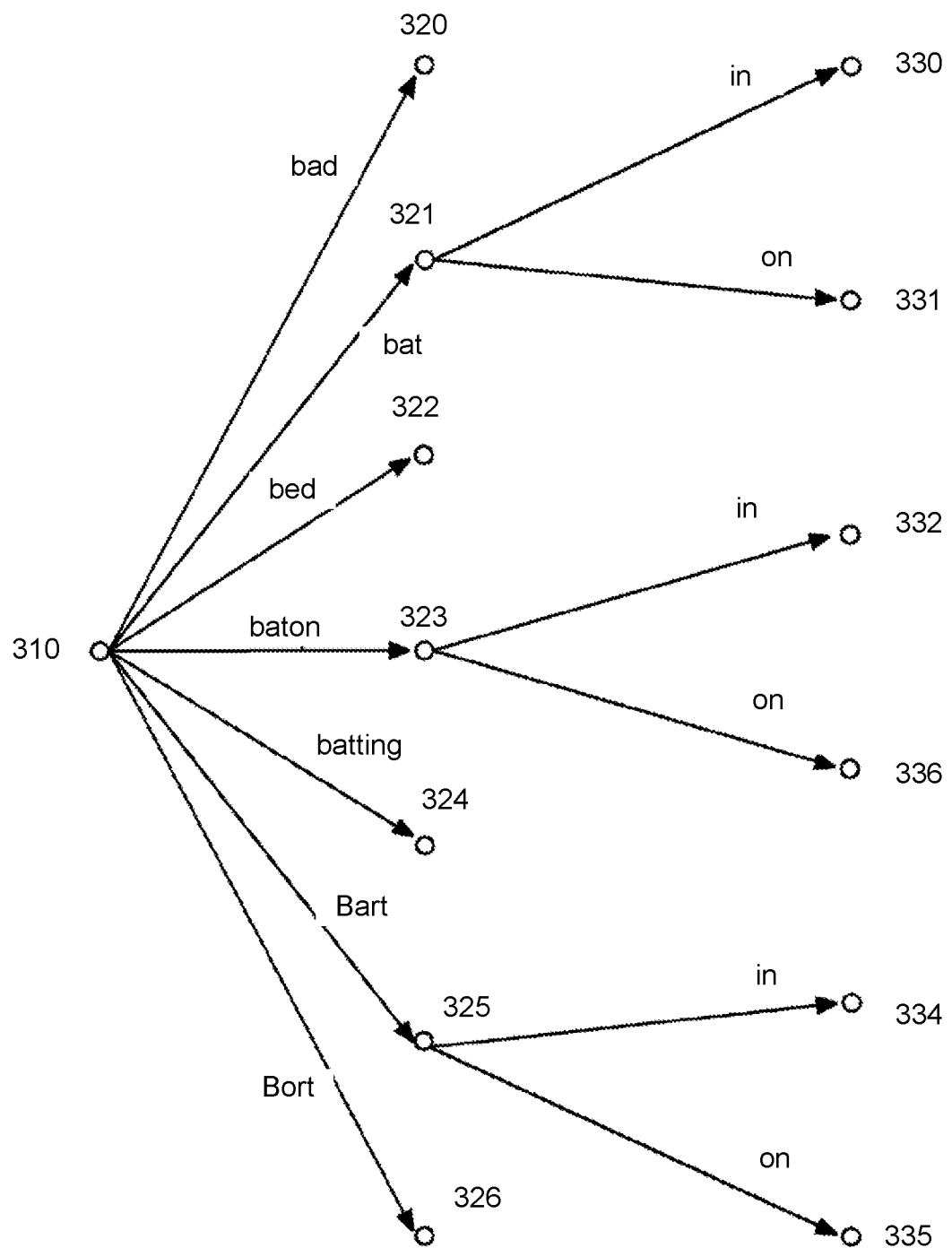
FIG. 3 illustrates a word result network according to embodiments of the present disclosure.

As the ASR engine 258 determines potential words from the input audio, the lattice may become very large as many potential sounds and words are considered as potential matches for the input audio. The potential matches may be illustrated as a word result network representing possible sequences of words that may be recognized and the likelihood of each sequence. In an example embodiment, the lattice or output data of the acoustic model(s) 253 may be stored in a data source or cached for later use, for example, while configuring a grammar model for OOV words. FIG. 3 shows an example of a word result network that may be used by an ASR engine 258 for recognizing speech according to some aspects of the present disclosure. A word result network may consist of sequences of words that may be recognized and the likelihood of each sequence. The likelihood of any path in the word result network may be determined by an acoustic model and a language model. In FIG. 3, the paths shown include, for example, "bad", "bat in", "bat on", "bed", "baton in", "baton on", "batting", "Bart in", "Bart on", and "Bort".

The system(s) 120 may include an adaptation component 259 which may be in communication with or included in the automatic speech recognition component 250. The adaptation component 259 is configured to operate various components to enable adaptation or configuration of a language model as the input audio data is processed during runtime to better recognize words that may correspond to a specific domain. Further details of the adaptation component 259 are described in relation to FIGS. 9, 10A, 10B, and 10C.

As illustrated in FIG. 3, a word result network may start at initial node 310. At node 310, no words may have been recognized yet as the ASR engine 258 commences its processing. From node 310, the ASR engine 258 may create arcs and additional nodes where each arc may be associated with a potential word that may be recognized. In some applications, words may be represented by nodes instead of arcs. In FIG. 3, arcs from node 310 to nodes 320 to 326 are labeled with example words that may be recognized by the ASR engine 258.

From initial node 310, the ASR engine 258 may apply acoustic and language models to determine which of the arcs leaving node 310 are most likely to occur. For an acoustic model employing HMMs, ASR engine 258 may create a separate HMM for each arc leaving node 310. Applying the acoustic and language models the ASR engine 258 may decide to pursue some subset of the arcs leaving node 310. For example, in FIG. 3, the ASR engine 258 may decide to follow the paths starting with "bad", "bat", and "bed" and may decide to stop pursuing the paths starting with "baton", "batting", "Bart," and "Bort" based on the respective scores of those arc, with the ASR engine 258 pursuing only the higher scoring arcs in an effort to concentrate computing resources on the arcs most likely to result in a correct result.

The ASR engine 258 may return an N-best list of paths along with their respective recognition scores, corresponding to the top N paths as determined by the ASR engine 258. An application (such as a program or component either internal or external to the ASR device 302) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

In one aspect of the disclosure, the ASR engine 258 may use a finite state transducer (FST) to perform speech recognition. An FST is a graph that may include all possible words that may be recognized by the ASR engine 258. While the word result network of FIG. 3 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 3. The word result network of FIG. 3 may be built out to include all possible utterances that could be recognized by the ASR engine 258. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is smaller than the word result network. An FST may be smaller because it may have cycles and/or it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be created by composing other FSTs. For example, an FST that includes words and phones may be created by composing an FST of words with an FST of phones.

In certain aspects, different finite state transducers (FSTs) are used for different speech processing tasks. One FST may be used for Hidden Markov Model (HMM) operations to input model temporal dynamics of speech such as phone duration (referred to as an "H" FST). Another FST may be used to model phonotactic context dependency (referred to as a "C" FST). Another FST may be the language FST used to map sequences of phones to words (referred to as an "L" FST). Finally, another FST, known as the grammar FST, models individual words to sequences of words that are likely to be used together (referred to as a "G" FST). The grammar model or grammar FST may output grammar data representing a sequence of words likely to be used together, such as lattice illustrated in FIG. 7. Thus, the H FST transduces an audio feature vectors (corresponding to audio frames) into context dependent phones, the C FST enforces usage constraints and transduces context dependent phones to context independent phones, the L FST transduces context independent phones to words and the G FST transduces words to words that are likely to make sense together, as according to a language model.

In certain situations certain operations may be grouped into a large FST that incorporates the different operations such as an HCLG FST that incorporates all of the above operations, thus yielding a final search graph that is the composition of the above FSTs. In other situations the operations are grouped differently, where one FST is an HCL FST and another FST is a G FST. This configuration may be useful for domain-specific or user-specific (or other customized) grammars (i.e., G FSTs) that can be swapped in or out for different incoming speech requests, and paired with an existing HCL FST to obtain desired speech results. A user-customized FST may be created by capturing information about how a user interacts with a voice-controlled system and noting what words are spoken by a user to a device. The system may then customize an FST by weighting more heavily word sequences frequently spoken by a user and/or including user-favored words in an FST that may otherwise not be included. Further, a domain specific language model may be configured based on the words that may be expected for a particular domain.

An FST may be constructed based on a text corpus that includes a large amount of text representing sentences that may be spoken by users. The FST is thus constructed so that it may represent a large number (though not necessarily infinite) number of potential sentences that may be spoken. The FST may be sufficiently granular, however, that each state may represent a particular acoustic unit (such as a senon, phoneme, etc.). Thus, each state of the FST may represent a portion in the progression of potential incoming sounds and how those sounds relate to spoken words. As incoming feature vectors corresponding to audio frames are processed by the ASR engine 258, it may travel from state to state along arcs of the FST. States/arcs that are traversed (and not pruned) are preserved to form a lattice. As each state of the FST is processed by a ASR engine 258, the engine 258 may keep track of the information associated with that portion of the FST (represented by outgoing labels on the arcs between FST states) to build the likely ASR result. Thus, words corresponding to traversed outgoing arcs may be used to construct the lattice, and from the lattice an N best list of potential ASR results.

The FST is thus a directed graph where each arc has certain properties such as input labels, output labels, a score associated with each arc, and an end state where the arc leads. As feature vectors for audio frames are processed by the ASR engine 258, it may traverse the FST to form a lattice representing potential speech recognition results, where the lattice is made up of nodes and/or arcs of the FST that, after traversal by the ASR engine 258, have satisfied the pruning thresholds to be maintained and not discarded. A lattice may also be formed using the acoustic models and language model described above. In the context of an FST, as the ASR engine 258 traverses through states in the FST, it may assign a score to each state or arc on the FST. After traversing an arc, the score of the arc of the FST, the score of the arc may be added to the total cost of the path leading to that arc. To save computational resources, the ASR engine 258 may prune and discard low recognition score states or paths that have little likelihood of corresponding to the spoken utterance, either due to low recognition scores, or for other reasons. Thus, a certain number of states may be preserved for each frame, and those states may be connected to states associated with the next frame (that survived a pruning), thus ultimately resulting in multiple paths through the FST representing potential speech recognition results. These multiple paths may be represented by the lattice, such as the lattice of FIG. 5, discussed below. After traversing the FST, the path with the best score (which may be the highest score or lowest score depending on the configuration of the FST) may be selected as the most likely path.

FIGS. 4A-4D illustrate different a small section of an ASR FST. In particular, FIGS. 4A-4D a small portion of an FST that may be traversed when processing audio data representing speech and determining whether that audio data corresponds to the word "bat" or the word "bad." The FST portion shows a single start state (state 0 shown in FIG. 4A) and multiple end states (states 62, 68, 69, 81, 82, and 83, shown in FIGS. 4C and 4D). In a full FST for speech processing there may be one or multiple start states and many more end states. Further, the end states may be located at various locations throughout the FST to represent different potential end portions that may be received by a potential utterance.

As can be seen in FIGS. 4A-4D, each state has one or more arcs outgoing from it that lead from the particular state to the next state. Each arc is associated with an input label, an output label and a score, shown in the figures as [input label]:[output label]/[score]. Thus, for example, arc 402 outgoing from state 0 to state 2 has an input label of 10, an output label of <eps> (explained below) and a score of 0.15137. The scores illustrated in FIGS. 4A-4D the scores represent scores or "costs" of each arc, where a lower scoring arc represents an arc that is more likely to be traversed/chosen than a higher scoring arc. In the present illustration of FIGS. 4A-4D, the illustrated scores roughly correspond to the negative logarithm of the probability the particular arc may be traversed, but multiple scoring configurations are possible. Further, the scores illustrated in FIGS. 4A-4D represent scores of the arcs in the FST prior to ASR processing. During processing, those scores will be adjusted using the scores of the acoustic model, as explained below. Although the scores illustrated represent one way of scoring arcs, other techniques may also be used. Further, while lower scores illustrated in FIGS. 4A-4D are considered "better," as in, more likely to be selected during ASR, in other configurations higher scores may be considered more likely to be selected.

As noted below, the input labels and output labels of an arc in an FST may include pointers to tables that track the individual labels. Further, for an ASR FST such as that illustrated in FIGS. 4A-4D, the input labels may correspond to individual acoustic speech units such as phonemes or senons or portions thereof. A senon is a grouping of HMM states which represents a particular grouping of phones as may be used together in speech. Each phone may have a number of incrementally different sounds depending on its context (e.g., the surrounding phones). While English may have approximately 50 phones it has several thousand sound groupings represented by senons. Use of senons in ASR processing may allow for improved ASR results. Thus, for example, arc 402 outgoing from state 0 in FIG. 4A has an input label of 10. That may correspond to entry 10 of an input label table, which in term may correspond to a particular phoneme or portion thereof, for example corresponding to a beginning of a "b" sound as might be spoken in "bat." Further remaining input labels on arcs outgoing from state 0 (4 in arc 404 from state 0 to state 3, 5480 in arc 406 outgoing from state 0 to state 5, 16 in arc 408 outgoing from state 0 to state 1, and 2 in arc 410 outgoing from state 0 to state 4) may each represent different acoustic units that may be identified by an acoustic model. In the example of the figures, these input labels may also correspond to different speech units that represent different ways of making a "b" sound. As the FST is traversed during ASR (explained below), the system may use the input labels to determine how to traverse the FST (based on the output from the acoustic model).

The output labels of the arcs may be collected by the ASR engine 258 for eventual use in outputting ASR results. As can be appreciated by FIGS. 4A-4D, however, many arcs have a label <eps> (either as input label or as output label) which represents the label epsilon (E). Epsilon is representative of a null label. That is, arcs with <eps> as an output label, have no output label and thus do not contribute any words to a potential ASR result. Arcs with <eps> as an input label do not need acoustic input to be traversed, and thus may be traversed as part of ASR processing without a new input audio feature vector. For example, if the ASR engine 258 reaches state 10, it may traverse arc 430 from state 10 to state 15 as there is no input label on that arc that refers to an indexed acoustic unit. The ASR engine 258, however, will not traverse arc 432 outgoing from state 15 until a new audio feature vector is processed, as arc 432 has an input label of 5570, which refers to an acoustic unit, thus requiring a new audio feature vector be processed before arc 432 is traversed.

Figure 4A:
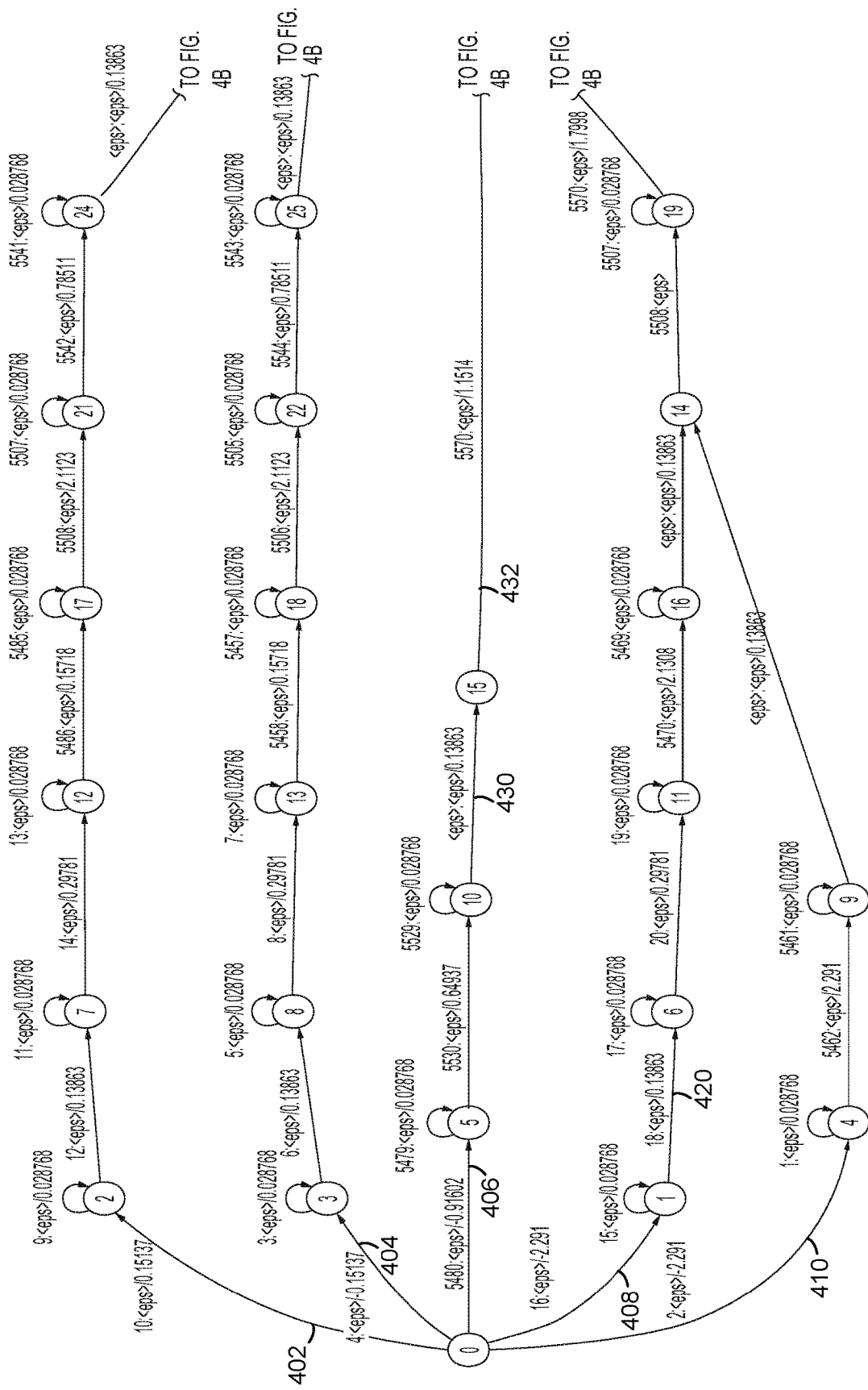
Figure 4D:
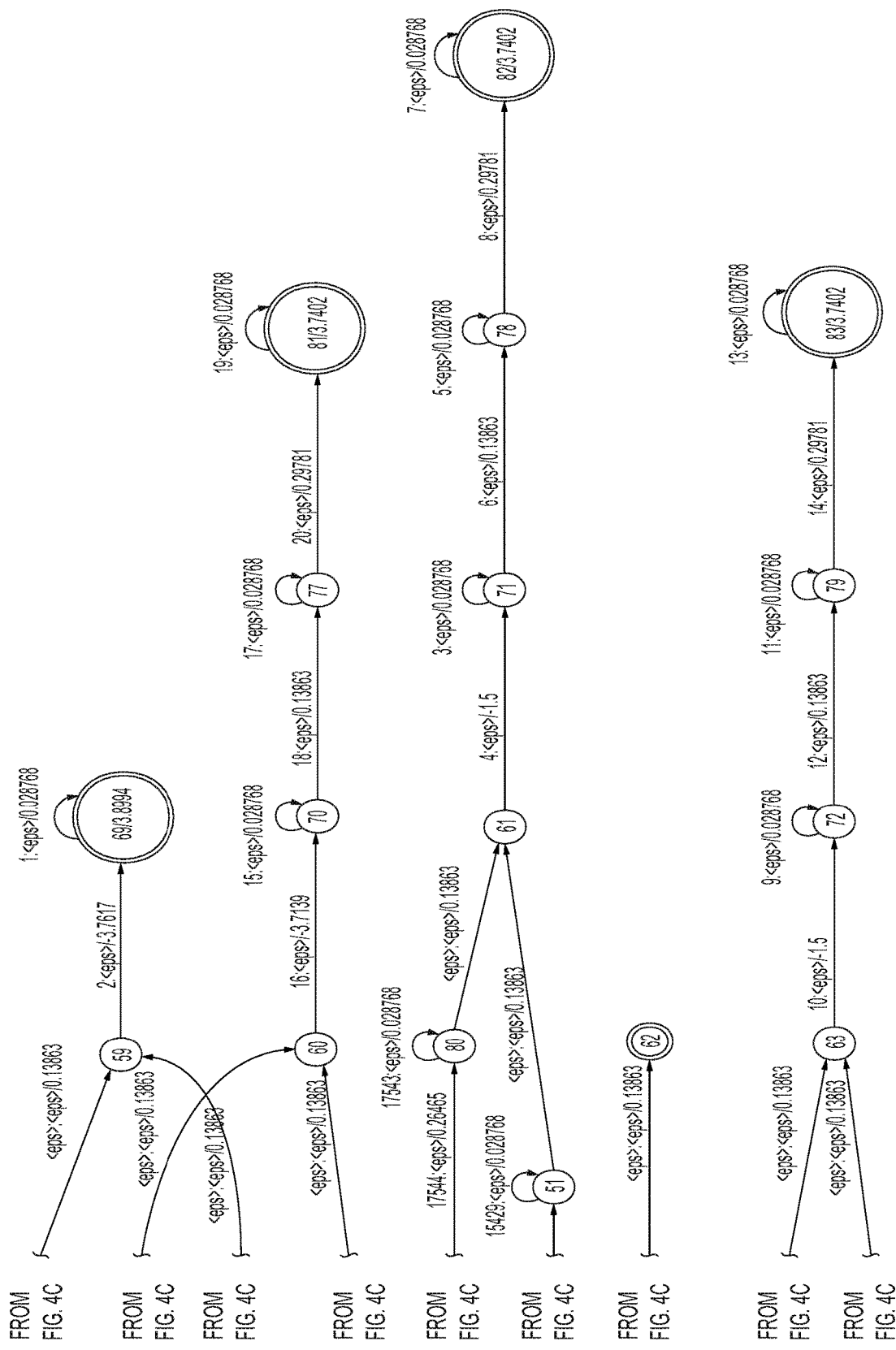

Only certain portions of an FST have an output label. For example, as shown in FIG. 4B, only arcs 440 and 442 have an output label. Arc 440, from state 23 to state 26 has an output label of "bad" and arc 442 from state 23 to state 27 has an output label of "bat." Because the FST portion of FIGS. 4A-4D only illustrate choosing between the words "bad" and "bat", the output labels corresponding to "bad" and "bat" are located at the point in the illustrated FST portion branches between the two words. Thus, only after the speech recognition system 258 has traversed those particular arcs (which can only be reached if the system traverses the arcs before), will the speech recognition system 258 output either the word "bat" or the word "bad" (with a corresponding score) from the FST. As can be appreciated, many states and arcs may be traversed before a word is output using an FST during ASR. This logically follows from the understanding that certain states of an FST may be correspond to a single audio frame, and an audio frame may be only 10 ms long. Thus many frames (and states) need to be processed before a word may be recognized.

Although an FST is a graphical construct as shown in FIGS. 4A-4D, when stored as data in the system, an FST may be represented as data in two or more tables. The two tables include a table of states (also referred to as nodes) and a table of arcs. The FST may optionally include a table of input labels and a table of output labels for particular arcs, though those label tables may be stored separately (and thus not be considered part of) the FST. Though this is configurable. As an example, the state/node table may contain a record for each state/node, with each state record consisting of the following four fields:

(1) Final score of the state,
(2) Offset in the arc array pointing to the beginning of the list of arcs outgoing from the state,
(3) Number of outgoing arcs with epsilon ($\epsilon$) input label, and
(4) Number of outgoing arcs with epsilon ($\epsilon$) output label.

Each of these fields may be represented by a particular N-bit integer (e.g., 16, 32, etc.). The integer size for a particular field may be different from that of a different field.

Thus, to represent a state with may outgoing arcs (for example, state 0 in FIG. 4A) the table entry for state 0 would include a final score of state 0, a pointer to the arc table corresponding to an arc table entry for a first arc outgoing from state 0 (for example 402), a number of outgoing arcs from state 0 with a null epsilon input label and a number of outgoing arcs from state 0 with a null epsilon input label. As FIG. 4A is an incomplete portion of an FST, it does not illustrate all the arcs from state 0 and thus does not show all the arcs containing an epsilon label. Although the entry for state 0 may only include a pointer to a first outgoing arc from state 0, the arc table and state table may be organized so that the entry in the state table for the next state, e.g., state 1, includes a pointer to the arc table for the first outgoing state from state 1, e.g., arc 420. The system may thus determine that any arcs from 402 up to, but not including 420, are outgoing from state 0.

The arcs table may contain the following information for each arc:

(1) Arc score,
(2) Next state ID (the end point of the arc)
(3) Input label (which may be a pointer to a label in a table of input labels)
(4) Output label (which may be a pointer to a label in a table of output labels)

Each of these fields may be represented by a particular N-bit integer. The integer size for a particular field may be different from that of a different field. Thus, to represent a particular arc, for example arc 420, the entry in the arc table may include an arc score (e.g., 0.13863), the next state ID for the arc (e.g., state 6), the input label (e.g., a pointer in a table of input labels to input label 18, which may correspond to a particular acoustic unit), and the output label (which is epsilon and thus may be blank, or set to a particular value that represents epsilon, or may point to an entry in the table of output labels that represents epsilon).

During runtime ASR processing, the ASR engine 258 may take incoming audio feature vectors corresponding to audio frames and may process them with an acoustic model 253. For each processed feature vector, the acoustic model processing will then result in acoustic model output including a list of potential acoustic units corresponding to the feature vector along with a corresponding list of acoustic scores for the respective potential acoustic units. The ASR engine 258 will then identify those acoustic units in the input labels of particular states currently under consideration at the FST and will rescore the arcs associated with those acoustic units using both the acoustic scores and the scores of the arcs built into the FST.

Take, for example, state 0 of FIG. 4A as an active state being considered as part of ASR processing. An incoming feature vector is received by the system and processed by the ASR engine 258 using acoustic model 253. The output of that processing may give certain scores for the acoustic units represented in the input labels of the arcs outgoing from state 0, for example:

unit 10, acoustic score $s_1$
unit 4, acoustic score $s_2$
unit 5480, acoustic score $s_3$
unit 16, acoustic score $s_4$
unit 2, acoustic score $s_5$ The ASR engine 258 may then take acoustic score Si and use it to adjust the existing score (0.84451) of arc 402 (which corresponds to unit 10). The scores may be added together, multiplied, or any other technique of combination. The resulting combined score may then be maintained by the system as the processed score corresponding to arc 402. The same process may be performed for each of the arcs outgoing from state 0 (as each of them have an input label corresponding to an acoustic unit) based on the scores corresponding to the acoustic units of their respective input labels, thus resulting in:

Updated score for 402=0.84451+($s_1$*sf)
Updated score for 404=0.84451+($s_2$*sf)
Updated score for 406=−0.22287+($s_3$*sf)
Updated score for 408=−1.5979+($s_4$*sf)
Updated score for 410=−1.5979+($s_5$*sf)

where sf is a scaling factor configured to adjust the acoustic scores so that they can be added to the scores of the FST. The scaling factor may be based on the particular acoustic model and/or FST. The same scaling factor may also be used to adjust each of the acoustic scores.

The destination states for the arcs processed (for example, states 1-5), may then be held in memory while the ASR engine 258 processes the next incoming feature vector corresponding to the next audio frame. The above process will then be repeated, so the acoustic model processing will output acoustic units with corresponding scores, the engine 258 will identify the corresponding units in input labels in arcs outgoing from FST states under consideration by the engine 258, the combines scores will be determined and stored. The process will continue in this manner for all input audio.

As the ASR engine 258 traverses the FST it will continue traversing states and arcs until it reaches a state with an outgoing arc, where the outgoing arc includes an input label corresponding to an acoustic which, which thus means the arc requires new information from the acoustic model to be traversed. For example, the ASR engine 258 may continue to traverse arcs until it arrives at an arc that has an input label corresponding to an acoustic unit. The ASR engine 258 will then wait for the next feature vector to be processed and for further input to come from the acoustic model until it continues processing. In this manner the ASR engine will perform time-synchronous decoding and will only consider portions of the FST in a frame-by-frame manner. That is, all the portions of the FST being processed at a particular time will all correspond to the same input audio frame/feature vector.

Further, as the ASR engine 258 traverses the FST, it may accumulate the combined scores for each path of the traversed nodes and/or arcs traversed up to each point in the FST. The combined score may be a sum of the updated scores (i.e., post acoustic model scores) of each state and/or arc traversed. For example, referring to the portion of the FST shown in FIG. 4A, if the ASR engine 258 has traversed along five paths to the point where it is currently at states 7, 8, 10, 6 and 9, each path will have a combined score leading up to the that point in the path. That is, the combined score for path 1 (currently at state 7) will be the summed updated scores for the nodes and arcs leading from state 0 to state 7, the combined score for path 2 (currently at state 8) will be the summed updated scores for the nodes and arcs leading from state 0 to state 8, the combined score for path 3 (currently at state 10) will be the summed updated scores for the nodes and arcs leading from state 0 to state 10, the combined score for path 4 (currently at state 6) will be the summed updated scores for the nodes and arcs leading from state 0 to state 6, and the combined score for path 5 (currently at state 9) will be the summed updated scores for the nodes and arcs leading from state 0 to state 9.

As the ASR engine 258 operates, there are certain pruning settings that affect how many states the ASR engine 258 may consider. One such pruning setting is the beam width. The beam width is a measurement of the score difference between a best scoring state (corresponding to the particular audio frame being processed) and the cutoff point.

When the ASR engine 258 has completed processing for a particular feature vector, that is the ASR engine 258 has processed the output from the acoustic model for the feature vector and rescored all the arcs and states corresponding to the acoustic units/scores output by the acoustic model (while discarding those that fall outside the beam width), there may be a certain number of states left within the beam that have received their combined scores. (Though note that not every state/arc will receive a combined score, only those that correspond to acoustic units seen by the AM will receive a combined score.) As the ASR engine 258 will continue to traverse arcs and states until a new acoustic unit is indicated as an input label, the states remaining after processing data for a particular audio frame will have outgoing arcs that correspond to an acoustic unit. Those outgoing arcs for those states will then be considered by the ASR engine 258 as new data for the next feature vector comes from the acoustic model processing.

The number of such states, however, may be very large which may result in significant processing by the ASR engine 258. Thus, the ASR may use a different pruning setting, namely a threshold number of active states. The threshold number of active states indicate the threshold number of states the ASR engine 258 will consider after processing acoustic model data from a first audio frame before it considers acoustic model data from a next audio frame. That is, if a threshold number of active states is 1000, and after processing data for a first audio frame, the engine 258 is considering 1,250 states corresponding to the first audio frame, the ASR engine will discard 250 states before beginning processing of data corresponding to the next audio frame. The discarded states are the states that have the lowest scores among the remaining active states (even if the discarded states were within the beam width). Thus, the maximum number of states keeps the ASR engine 258 from being overwhelmed as it transitions from frame to frame.

As the ASR engine 258 traverses the FST it may store data corresponding to the states and arcs traversed along with their combined scores. That may include a table of entries, for example tokens, where each token corresponds to a state in the search space (i.e., the traversed portions of the FST that fell within the beam width and the threshold number of active states). Each token may include a score representing the likelihood that the state is reached from the beginning of the utterance up until the frame of the state. The token may also include a pointer in the table to a previous state, such as the state most likely to lead to the present state, and the arc from the most likely previous state to the present state. The token may also include the input label and output label (if any) of the arc that leads from the most likely previous state to the present state. The input label and/or output label may be a pointer to a table of labels and may indicate a phoneme, senon, word, or other speech unit. The token may also include links to more than one previous state (and corresponding scores, arcs, labels, etc.).

As the ASR engine traverses portions of the FST, it may use the table of tokens representing the states and arcs traversed, along with their combined scores, to create a lattice of potential paths representing potential ASR results. A sample lattice is shown in FIG. 5. The lattice 502 shows multiple potential paths of speech recognition results that may have been determined by the ASR engine 258 by traversing an FST or by using different acoustic model/language model processing. Paths between large nodes represent potential words (for example "bad", "bay", etc.) and paths between smaller nodes represent potential phonemes (for example "B", "A", "T", and "B", "A", "D"). For purposes of illustration, individual phonemes are only shown for the first two words of the lattice. The two paths between node 504 and node 506 represent two potential word choices, "bat in" or "bad on". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the ASR engine 258 as the ASR result for the associated feature vectors. Following ASR processing, the ASR results may be sent to a downstream component, such as a speechlet component 290 for further processing (such as execution of a command included in the interpreted text). Thus the data preserved by the ASR engine 258 during traversal of the FST may result in a lattice representing the most likely possible ASR results (as the least likely results were discarded during pruning). The mostly likely path of the ASR results, for example the Viterbi path, may be selected as the top scoring result for command execution.

FSTs can constitute the bulk of an ASR model, with HCLG being particularly large, sometimes reaching tens of gigabytes in some models. As noted above, an HCLG functionality maybe incorporated into a single FST. In other configurations, HCL functionality may be incorporated in one FST, whereas G functionality (i.e., functionality of a grammar or language model) may be incorporated into a different FST. In such as situation, an HCL FST is traversed using output from an acoustic model (as generally described above) to traverse the HCL FST, with the resulting output being one or more potential words and corresponding scores. When the end of a word is reached the HCL FST is traversed again anew (using further acoustic model output) for the next word. Each word(s) and corresponding score(s) from the HCL FST is then output for the system to use traverse the G FST. The G FST represents the possible word groupings (e.g., sentences) that the system may expect to receive. The G FST (or other form of language model) is constructed based on the universe of example text used by the system when building the language model.

Figure 6:
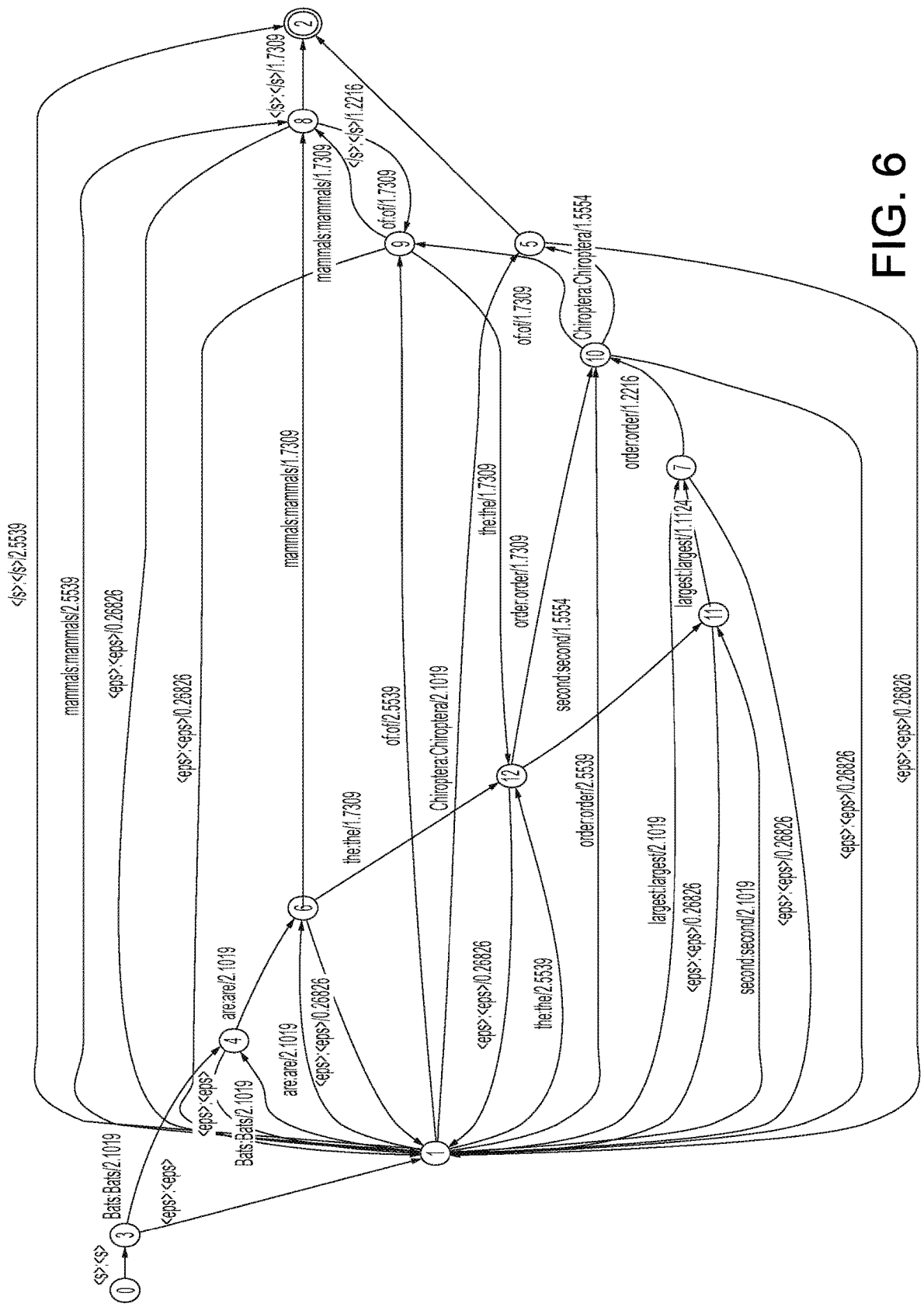
FIG. 6 illustrates a section of a finite state transducer according to embodiments of the present disclosure.

An example of a portion of a G FST is shown in FIG. 6. The FST portion shown in FIG. 6 is a portion of a G FST language model constructed from two sentences, the first being "bats are mammals of the order Chiroptera" and the second being "bats are the second largest order of mammals." The portion of the FST shown in FIG. 6 may normally appear in a much larger FST as part of a general ASR language model, but is shown in FIG. 6 for purposes of illustration. Further, while a complete G FST may be configured to recognize any sequence of the words shown in FIG. 6, the particular illustrated sequences may be more likely due to the construction of the FST (which itself is based on a universe of available text from a text corpus). To traverse the G FST, word outputs from an HCL FST (or other model configured to construct words from sounds output by an acoustic model) are used to determine which arcs to traverse along the G FST. As arcs are traversed, word output labels associated with those arcs are output to form the potential text output that is eventually output as the ASR result. Multiple paths through a G FST may be traversed (with respective scores) thus resulting in an N-best list output of a word string (e.g., a sentence) that potentially represents the input audio data.

Although a G FST may have an arbitrary structure, a language model may have an N-gram model. An N-gram is an ordered sequence of N words. Thus, a size 2 N-gram (for example a bi-gram) includes two words in order for example "I am," "I think," or the like. A size 3 N-gram (for example a trigram) includes two words in order for example "I like to," "I need to," or the like. Certain benefits to representing word groupings as N-grams in a language model FST include their ease of construction, fast computation during runtime decoding of input speech and efficient representation within the FST.

Figure 7:
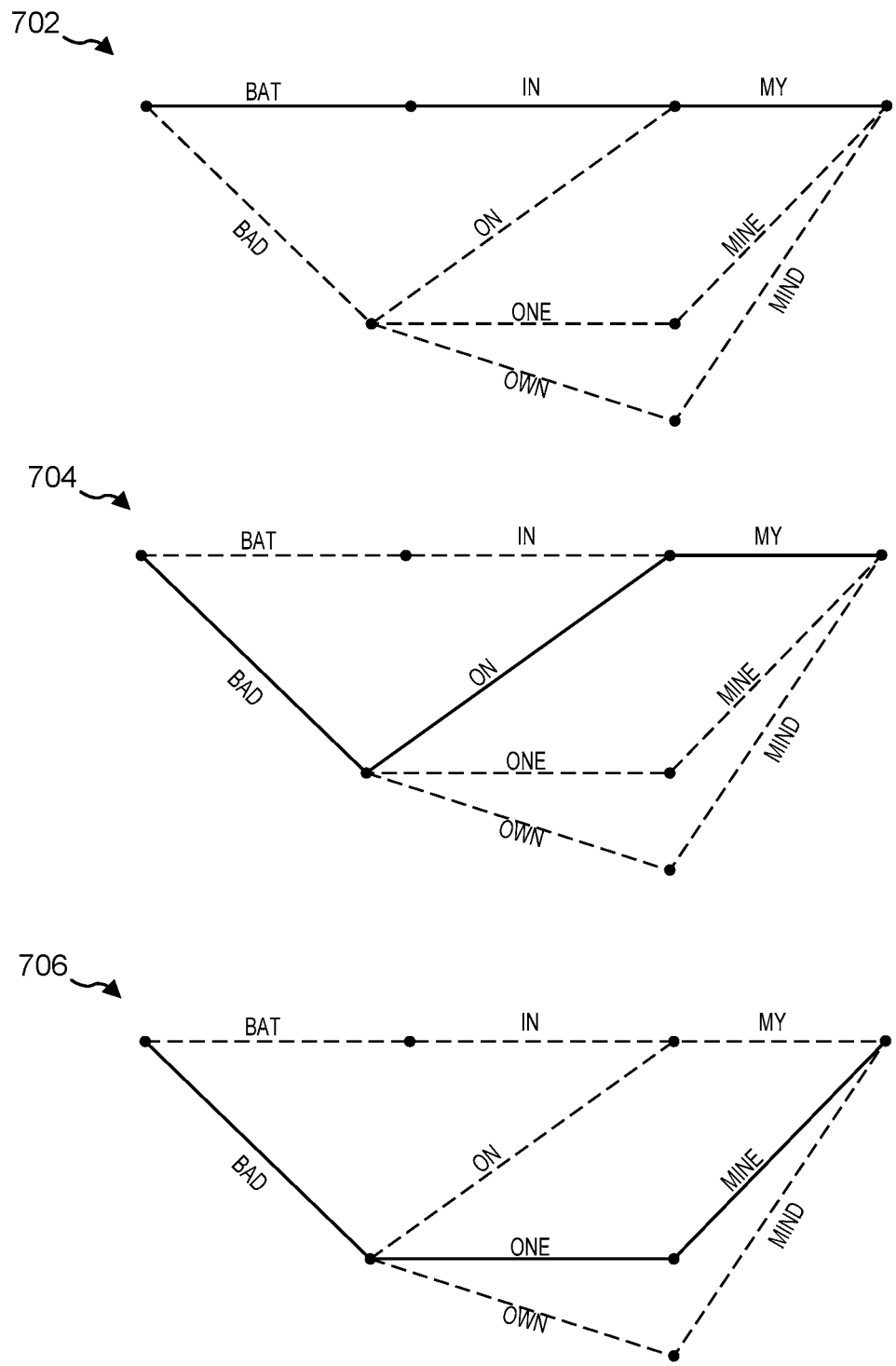
FIG. 7 illustrates different ways of traversing the lattice of FIG. 5 according to embodiments of the present disclosure.
Figure 8:
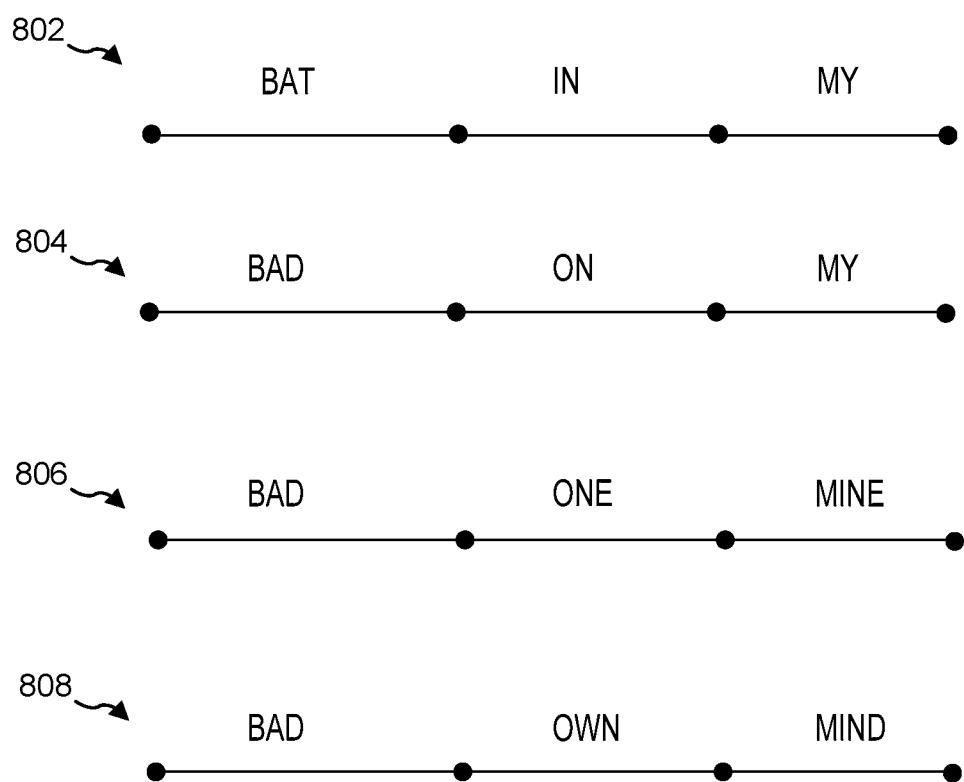
FIG. 8 illustrates an N-best list of hypotheses associated with the lattice of FIG. 5 according to embodiments of the present disclosure.

To simplify the illustration of traversing different path results, illustrated in FIG. 7 are different potential paths along the lattice 502. As shown in FIG. 7, path 702 results in "bat in my," path 704 results in "bad on my" and path 706 results in "bad one mine." As can be seen, many such paths are possible even in the small example lattice 502. An example of such paths 802-808 are shown in FIG. 8. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc. As noted above, an ASR component (such as component operating a language model) may output an N-best list, such as the list of potential results shown in FIG. 8, may output a single top scoring answer (e.g., 802) or may output an entire lattice as well as corresponding scores.

In addition to the traditional top sentence of words or N-best result, an ASR component may be configured to output various data calculated by the ASR component during processing. Such data may include, for example, speech units (such as phones), probabilities/scores associated with certain speech units or words, audio frame timing, or the like. A system may be configured to use such data to perform various tasks, for example to confirm the results of ASR processing, which may in turn be used to perform various processing to update a store of facts and information available to a system for query answering.

One such technique, for example, is use of an encoder. Encoding is a general technique for projecting a sequence of features into a vector space. One goal of encoding is to project data points into a multi-dimensional vector space so that various operations can be performed on the vector combinations to determine how they (or the data they contain) related to each other. For example, if usage of two sentences such as "What's the weather today?" and "Is it going to rain today?" are projected into a vector space (where each vector is populated with data points representing how or when the sentences are used), the two sentences would likely end up being close to each other in the vector projection space, thus representing the similar usage of the two sentences. It can be valuable to encode certain features into a vector space to perform various operations.

Machine learning, as discussed here in, refers to a computing technique that allows systems to learn ways to solve complex problems without needing an explicit algorithm for the system to follow. ML may use a trained model that consists of internally configured operations that can manipulate a particular type of input data to determine a desired result. Trained models can be used in many computing tasks such as computer vision, speech processing, predictive analyses, and many more.

Trained models may take a variety of forms including trained classifiers, support vector machines (SVMs), neural networks (such as deep neural networks (DNNs), recurrent neural networks (RNNs), or convolutional neural networks (CNNs) and others. As an example, a neural network can include an input layer, an output layer and one or more intermediate hidden layers where the input layer is configured to take in a certain kind of data and the output layer is configured to output the desired kind of data to result from the network and the hidden layer(s) perform a variety of functions to generate output data from the input data.

Various techniques may be used to train machine learning models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

Figure 9:
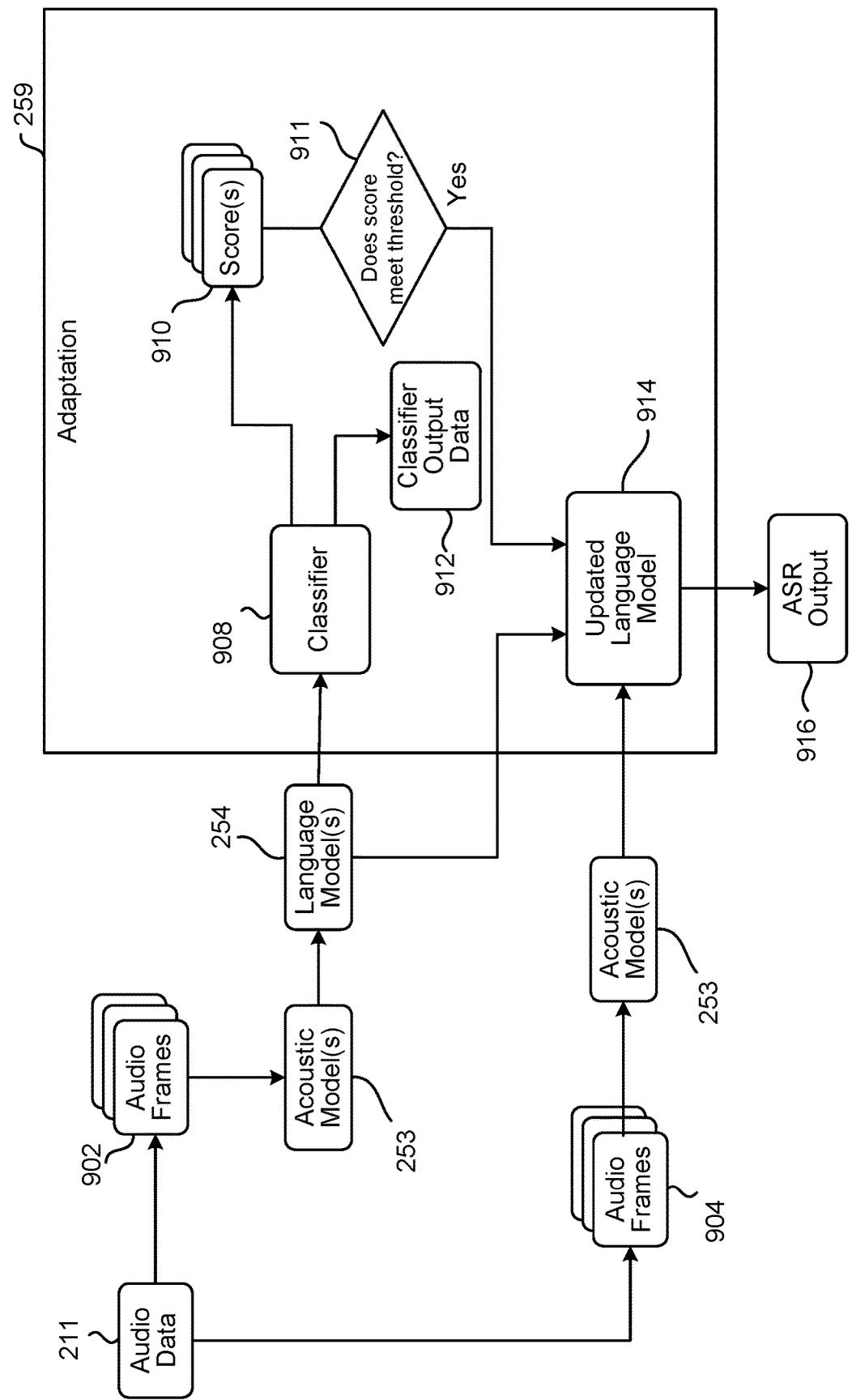
FIG. 9 conceptually illustrates a system for adapting the language model for domain-specific processing according to embodiments of the present disclosure.

FIG. 9 conceptually illustrates a system for adapting the language model for domain-specific processing according to embodiments of the present disclosure. The system(s) 120 includes adaptation component 259 that is configured to adapt or update a language model 254, using domain-specific information, to determine an updated language model 914. The adaptation component 259 includes a classifier 908 that is configured to output score(s) 910 and classifier output data 912. In some embodiments, the system described herein processes some audio frames of the input audio data using a first language model to determine partial ASR hypotheses corresponding to the word or words represented in the processed audio frames. As used herein, a partial N-best list or partial ASR hypotheses refers to a N-best list or hypotheses corresponding to a portion of the utterance represented in input audio data.

The system(s) 120 receives audio data 211 representing an utterance spoken by a user. The system(s) 120 processes a first set of audio frames 902 of the audio data 211 (e.g., the first 10 audio frames, each audio frame being 20 to 30 ms of audio data) using an acoustic model 253 to determine the sounds represented in the audio frames 902. The output of the acoustic model 253 (for example, acoustic data indicating one or more acoustic units) is processed by the language model 254 to determine the words represented by the sounds. The acoustic model 253 may provide output data corresponding to individual audio frames 902 to the language model 254 for processing. The language model 254 outputs language model output data indicating a likelihood of a particular word being represented in the audio frames 902. As described above, the language model 254 may output data in the form of a list of hypotheses (e.g., N-best list) and corresponding confidence scores.

The output of the language model 254 is processed by the classifier 908. The language model 254 may provide the language model output data to the classifier 908 after all of the audio frames 902 are processed. As such, the classifier 908 receives language model output data corresponding to multiple audio frames, and in some cases, corresponding to a word represented in the audio data 211 when the set of audio frames 902 span an entire word. The classifier 908 may receive input from the language model 254 in various forms, for example, a list of hypotheses (e.g., N-best list), one hypothesis (e.g., 1-best or the best hypothesis) or a lattice.

The classifier 908 may be a machine learning model trained to determine if a word represented in the language model output data corresponds to a particular domain. In an example embodiment, the classifier 908 may be a probabilistic classifier (e.g., a Max Entropy classifier). In another embodiment, the classifier 908 may be neural network machine learning model (e.g., LSTM or DNN). The classifier 908 may be trained on audio data representing particular words that correspond to a specified domain. For example, the audio data used for training the classifier 908 may include speech representing a set of words and may be labeled as corresponding to a particular domain.

The classifier 908 outputs a score(s) 910 and classifier output data 912. The score 910 may indicate a probability or likelihood that the portion of the utterance represented in the set of audio frames 902 correspond to a particular domain. The classifier 908 may output multiple scores 910 each indicating the likelihood of the utterance corresponding to a different domain. The system(s) 120 determines if the score(s) 910 meet a threshold, that is, the scores indicate with a certain level of confidence that the utterance corresponds to a particular domain. If the score(s) 910 meet the threshold, then the system(s) 120 determines updated language model 914 using the classifier output data 912 and the language model 254.

The classifier output data 912 may include data representing a domain that the audio frames 902 may correspond to. In some embodiments, the classifier output data 912 may include a pointer to a data storage storing a particular domain-specific language model including model weights and parameters. The system(s) 120 may determine the updated language model 914 by updating the model weights of the language model 254 using the model weights of the domain-specific language model.

In other embodiments, the classifier output data 912 may output a data vector representing scores indicating a likelihood of the portion of the utterance corresponding to different domains. The scores may be score(s) 910. For example, the data vector may be <0, 1, 0, 0> indicating that the utterance may correspond to a domain represented at the second data value (e.g., shopping domain), but not correspond to domains represented at the first, third and fourth values. In some cases, one of the data values (e.g., the first data value) represents no domain, that is, the utterance does not correspond to any particular domain the classifier 908 is trained to predict. As another example, the data vector outputted by the classifier 908 may be <0.5, 0, 0.75, 0.3> indicating a 0.5 probability of the utterance corresponding to none of the domains (e.g., the system is unable to determine which domain the utterance corresponds to), 0 probability the utterance corresponds to a first domain (e.g., the shopping domain), 0.75 probability the utterance corresponds to a second domain (e.g., the navigation domain), and 0.3 probability the utterance corresponds to a third domain (e.g., the music domain). The system(s) 120 may configure a large language model with multiple subcomponents (representing information specific to multiple domains) that can be interpolated dynamically during runtime. Such a language model may include multiple weights for each arc and node, where each weight can represents a weight corresponding to a generic language model or a domain-specific language model. For example, one arc in the language model may be associated with a data vector <$w_1$, $w_2$, $w_3$, $w_4$>, where $w_1$ may correspond to a generic language model, $w_2$ may correspond to the shopping domain, $w_3$ may correspond to the navigation domain, and $w_4$ may correspond to the music domain. The system(s) 120 may determine the updated language model 914 using the weight data vectors of the language model and the probability data vector outputted by the classifier 908. For example, the system(s) 120 may multiply the data vector <$w_1$, $w_2$, $w_3$, $w_4$> with the probability data vector <0.5, 0, 0.75, 0.3> to determine the model weights of the updated language model 914, thus enabling the updated language model 914 to analyze audio frames with respect to multiple domains at the same time.

Figure 11:
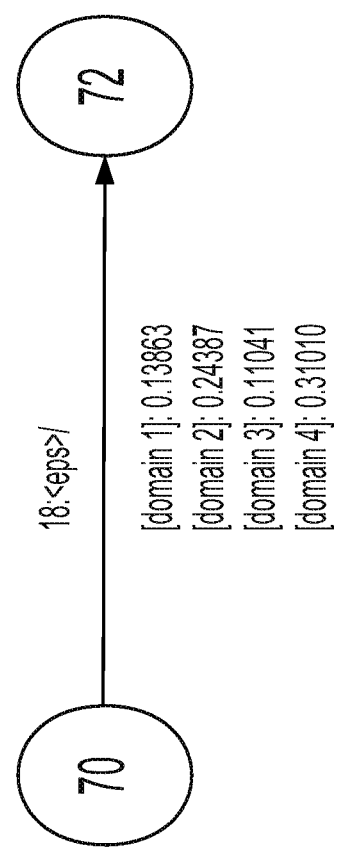
FIG. 11 conceptually illustrates a section of a finite state transducer having weights corresponding to multiple domains according to embodiments of the present disclosure.

FIG. 11 conceptually illustrates a section of a FST having weights corresponding to multiple domains. Further details on FSTs are described above in connection with FIGS. 4A-4D. In an example embodiment, the language model may be a FST having a path between two nodes that may have different scores associated with it. The score for use during runtime is selected based on the domain determined by the classifier 908.

In another embodiment, the classifier output data 912 may include a list of N-grams corresponding to a particular domain, and may also include a boost value corresponding to each N-gram that are linked to the particular domain. The system(s) 120 may determine an updated language model 914 by increasing or boosting the model weights of the language model 254 corresponding to the N-grams outputted by the classifier 908. The system(s) 120 may boost the model weights using a boost value corresponding to each N-gram as indicated by the classifier output data 912. For example, the list of N-grams may indicate a list of approximately 10,000 words/word combinations that correspond to a particular domain. The system(s) 120 determines which model weights in the language model 254 correspond to those 10,000 words/word combinations and increase those model weights so that when the next set of audio frames are processed those words are assigned a higher probability.

In another embodiment, the classifier output data 912 may include a list of N-grams representing a set of words that may not correspond to any particular domain. The data 912 may also include a boost value corresponding to each N-gram. In this case, the classifier 908 may be trained to determine a list of words that should be boosted based on the input audio frames representing a particular word. The system(s) 120 may determine the updated language model 914 by boosting model weights of certain words in the language model 254.

The system(s) 120 processes a second set of audio frames 904 using the acoustic model 253 and the updated language model 914. The second set of audio frames 904 may be the next 10 frames of the audio data 211. In an example embodiment, discussed in further detail in connection with FIGS. 10A-10C, the system(s) 120 evaluates the output of the updated language model 914 with respect to the set of audio frames 904 using the classifier 908 to determine if the utterance (as processed so far) corresponds to a particular domain. The classifier 908 may determine additional score(s) 910 with respect to the audio frames 904. The additional score(s) 910 may indicate a new likelihood of the utterance corresponding to a particular domain (the same domain as before or a new domain). In some cases, the additional score 910 may be higher than the previous score, indicating a higher likelihood or probability that the utterance corresponds to the same domain. If the additional score meets the threshold, then an additional updated language model 914 may be determined using the process described above.

The system(s) 120 may continue to process the next set of audio frames using the adapted language model, and evaluating the language model output data using the classifier 908. When all of the audio data 211 (the entire utterance) is processed, the system(s) 120 determines ASR output 916 including a hypothesis for the words represented in the audio data 211.

In this manner, the system is configured to process a first set of audio frames of input audio data using a first language model (e.g., a generic language model) to determine language model output data for a portion of the input audio data, which is processed by a trained classifier to determine if the portion of the input audio data corresponds to a particular domain. If the classifier determines that the portion corresponds to a particular domain, then the system determines a second language model that incorporates domain-specific information. The next set of audio frames are processed using the second language model. The system continues to evaluate language model output data corresponding to the next set of audio frames using the classifier to ensure that the next audio frames correspond to the same domain. If the classifier determines a change in the domain as more portions of the utterance are processed, then the system adapts the second language model accordingly with data corresponding to another domain. If the classifier determines a higher likelihood of the utterance corresponding to the same domain as more portions of the utterance are processed, then the system may update the second language model accordingly.

In an example embodiment, the adaptation component 259 may include a neural network machine learning model configured to process the partial N-best list generated by the language model 254 to determine one or more domains the utterance may correspond to. The score(s) 910 may indicate that the N-best list corresponding to the portion of audio data processed so far (e.g., audio frames 902) needs to be processed further and that the utterance, as processed so far, corresponds to a particular domain. The partial N-best list may be processed using the neural network machine learning model to determine model weights corresponding to the particular domain that can be used to determine the updated language model 914.

Figure 10A:
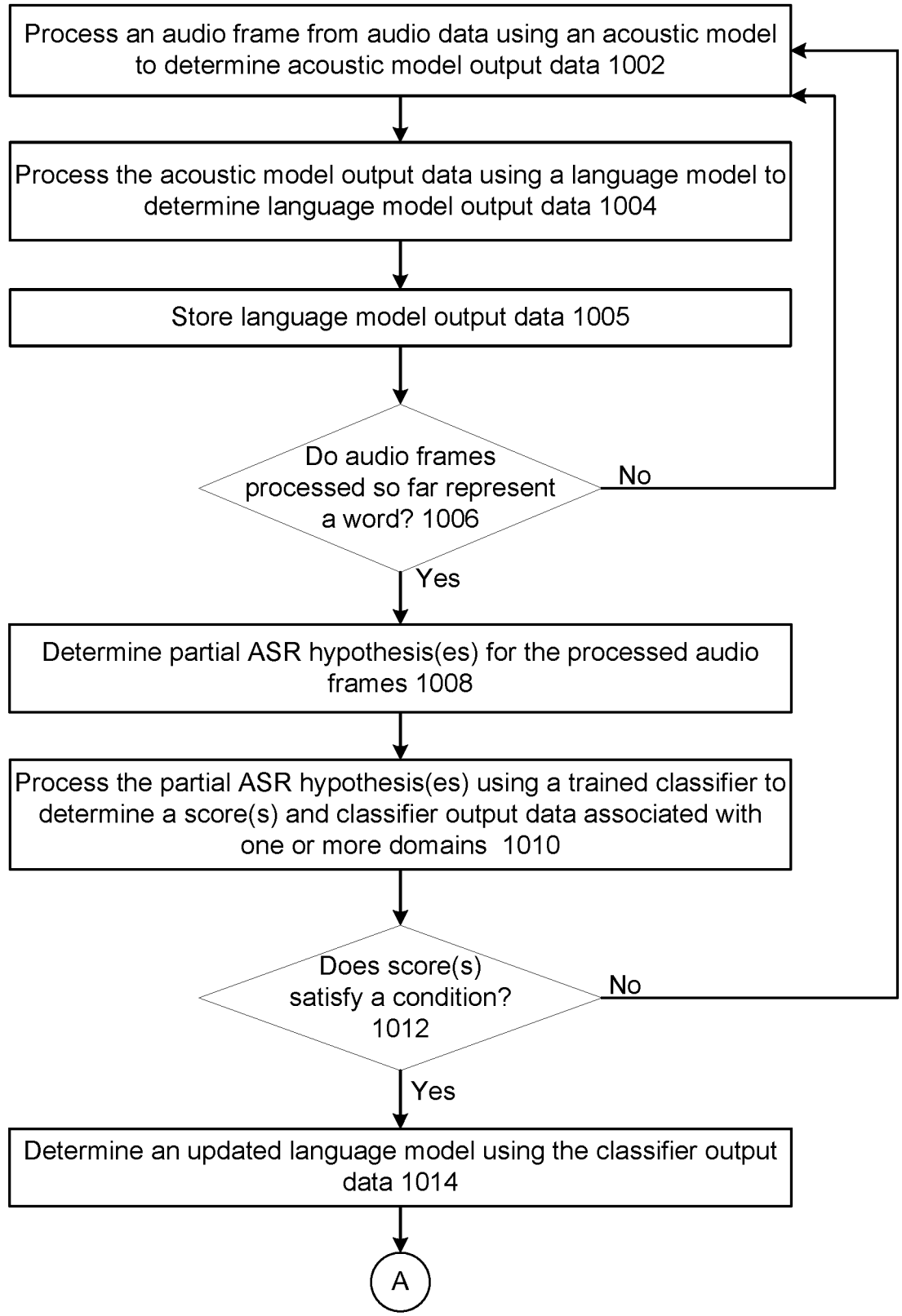
FIGS. 10A-10C illustrate a process for adapting the language model based on partial analysis of the audio data according to embodiments of the present disclosure.
Figure 10B:
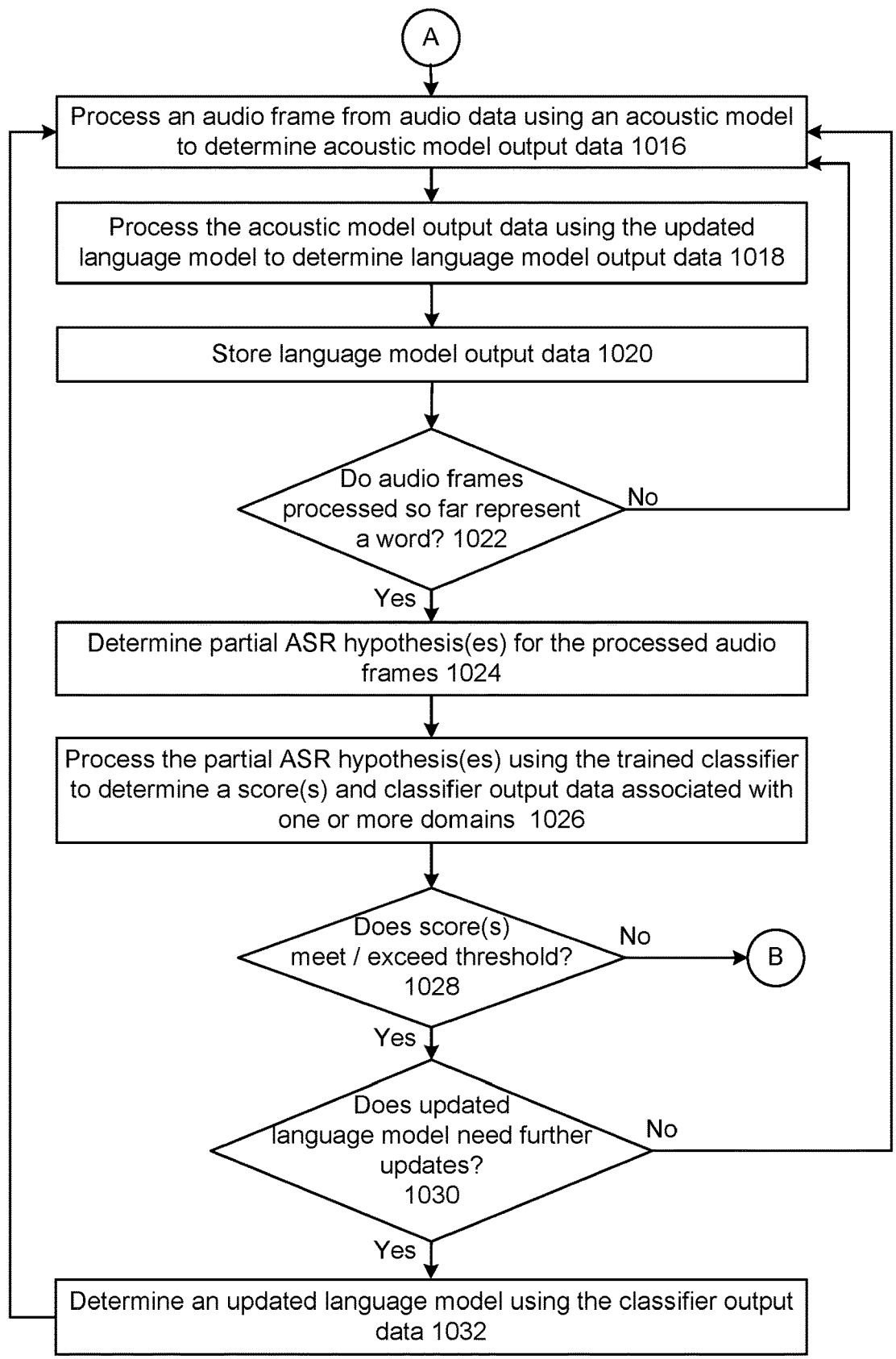
Figure 10C:
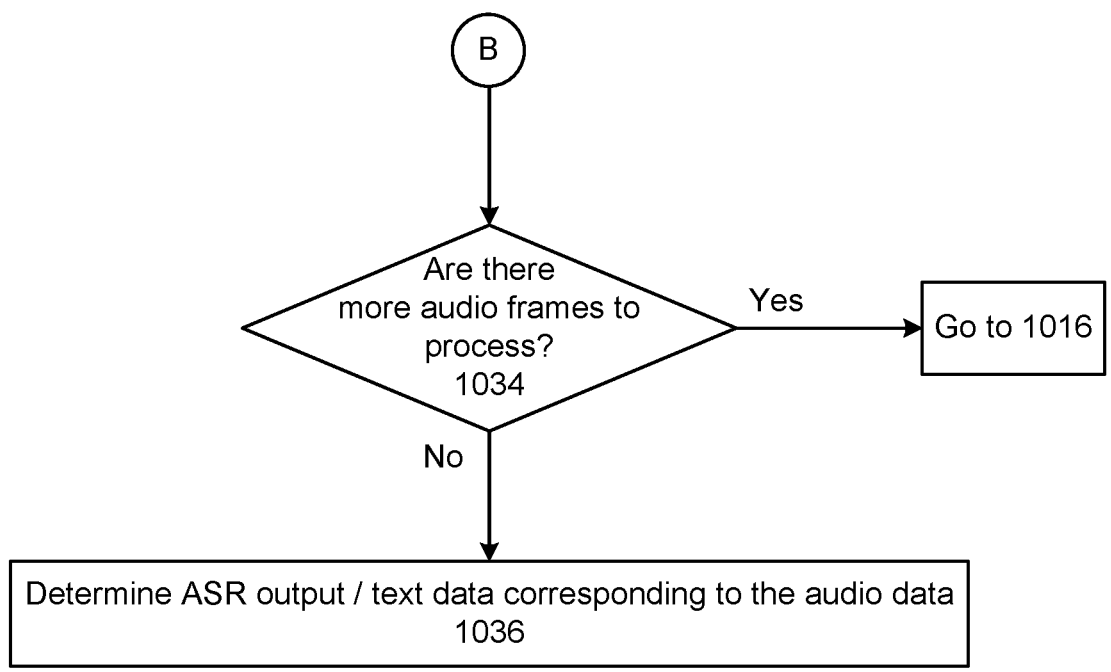

FIGS. 10A-10C illustrate a process for adapting the language model based on partial analysis of the audio data according to embodiments of the present disclosure. The system(s) 120 may process (1002) an audio frame of the audio data 211 using an acoustic model 253 to determine acoustic model output data. The system(s) 120 may process (1004) the acoustic model output data using a language model 254 to determine language model output data. The system(s) 120 may store (1005) the language model output data. The system(s) 120 may determine (1006) whether the audio frame processed so far represents a word. If the audio frames processed so far do not represent a word (e.g., the sounds represented in the audio frames do not form an entire word), then the system(s) 120 continue to process additional audio frames per operations 1002 and 1004 and continues storing (1005) the language model output data for the audio frames processed so far.

If the audio frames processed so far represent a word, then the system(s) 120 may determine (1008) a partial ASR hypothesis(es) corresponding to the audio frames processed so far. The partial ASR hypotheses may be a N-best list generated by the ASR engine 258. The partial ASR hypothesis(es) may be determined from the stored language model output data. The system(s) 120 may process (1010) the partial ASR hypothesis(es) using a trained classifier to determine a score(s) (e.g., 910) and classifier output data (e.g., 912) associated with one or more domains. The score(s) may indicate a likelihood of the utterance, as processed so far, corresponds to a particular domain. The system(s) 120 may determine (1012) if the score(s) satisfy a condition, for example if the score(s) meet or exceed a threshold. If the score(s) does not meet or exceed the threshold, the system(s) 120 continues to process additional audio frames at operation 1002.

If the score(s) meet or exceed the threshold, the system(s) 120 may determine (1014) an updated language model using the classifier output data. The system(s) 120 may determine an updated language model using various techniques. In one embodiment, the system(s) 120 may determine the updated language model using model weights from a domain-specific language model. The domain-specific language model may be determined based on the classifier determining which domain the utterance corresponds to.

In another embodiment, the system(s) 120 may determine the updated language model using the model weights of the language model and the score outputted by the classifier. For example, the system(s) 120 may multiply the model weights with the score. In one embodiment, the language model may include multiple weights (stored in a weight data vector) for each arc and/or node, where each weight corresponds to a particular domain. The classifier output data may include a probability data vector representing scores indicating a likelihood of the portion of the utterance corresponding to different domains. The system(s) 120 may determine the updated language model using the weight data vectors of the language model and the probability data vector outputted by the classifier.

In another embodiment, the classifier output data may include a list of N-grams corresponding to a particular domain, and may also include a boost value corresponding to each N-gram. The system(s) 120 may determine an updated language model by increasing or boosting the model weights of the language model corresponding to the N-grams outputted by the classifier. The system(s) 120 may boost the model weights using a boost value corresponding to each N-gram as indicated by the classifier output data.

The system(s) 120 may continue the process at operation 1016 (FIG. 10B). The system(s) 120 may process (1016) an audio frame (e.g., the next unprocessed audio frame) from the audio data 211 using an acoustic model to determine acoustic model output data. The system(s) 120 may process (1018) the acoustic model output data using the updated language model to determine language model output data. The system(s) 120 may store (1020) the language model output data. The system(s) 120 may determine (1022) whether the audio frames processed so far represents the next word in the utterance. If the audio frames processed so far do not represent a word (e.g., the sounds represented in the audio frames do not form an entire word), then the system(s) 120 continues to process additional audio frames per operations 1016 and 1018 and continues storing (1020) the language model output data for the audio frames processed so far.

If the audio frames processed so far represent the next word in the utterance, then the system(s) 120 may determine (1024) a partial ASR hypothesis(es) corresponding to the audio frames processed so far. The partial ASR hypothesis(es) may be determined from the stored language model output data. The system(s) 120 may process (1026) the partial ASR hypothesis(es) using the trained classifier to determine a score(s) (e.g., 910) and classifier output data (e.g., 912) associated with one or more domains. The score(s) may indicate a likelihood of the utterance, as processed so far, corresponding to a particular domain. The system(s) 120 may determine (1028) if the score(s) meet or exceed a threshold. If the score does not meet or exceed the threshold, the system(s) 120 proceeds to operation XXL02 (FIG. 10C).

If the score meets or exceeds the threshold, the system(s) 120 may determine (1030) whether the updated language model needs to be updated further. For example, the score outputted by the classifier may indicate that the utterance, as processed so far, corresponds to the same domain as determined in operation 1010. The score determined in 1026 may be the same as the score determined in 1010. In which case, the system(s) 120 does not make further updates to the updated language model. If the score outputted by the classifier in 1026 is different than the score outputted in 1010, then the system(s) 120 may determine (1032) an updated language model using the classifier output data from 1026. After determining an updated language model, the system(s) 120 may continue processing (1016) the next audio frame of the audio data 211, where in operation 1018 the acoustic model is processed using the updated language model determined at operation 1032. In operation 1034, the system(s) 120 may determine if there are any more audio frames from audio data 211 that have not been processed. If yes, then the system(s) 120 continues processing the audio frames at operation 1016.

If there are no more audio frames and the utterance represented in the audio data 211 has been processed in its entirety, then the system(s) 120 may determine (1036) ASR output data or text data representing the utterance in the audio data 211. As the system(s) 120 processes the sets of audio frames, the system(s) 120 may update the partial ASR hypotheses to include text data corresponding to the audio frames processed so far. For example, the system(s) 120 may process a first set of audio frames and determine partial ASR hypotheses representing text data (and scores) corresponding to the first set of audio frames. The system(s) 120 may then process a second set of audio frames, and update the partial ASR hypotheses to represent text data (and scores) corresponding to the first and second set of audio frames.

In an example embodiment, the system(s) 120 may store the best hypothesis/text data corresponding to each set of audio frames that are processed, and combine the hypotheses/text data to determine the hypothesis for the entire utterance. For example, the system(s) 120 may store a first hypothesis/first text data corresponding to the first set of audio data that are processed by a language model, and may store a second hypothesis/second text data corresponding to the second set of audio data that are processed by the language model or an updated language model, and so on. In operation 1036, the system(s) 120 may combine the first hypothesis/first text data and the second hypothesis/second text data to determine a hypothesis for the entire utterance represented in the input audio data.

Figure 12:
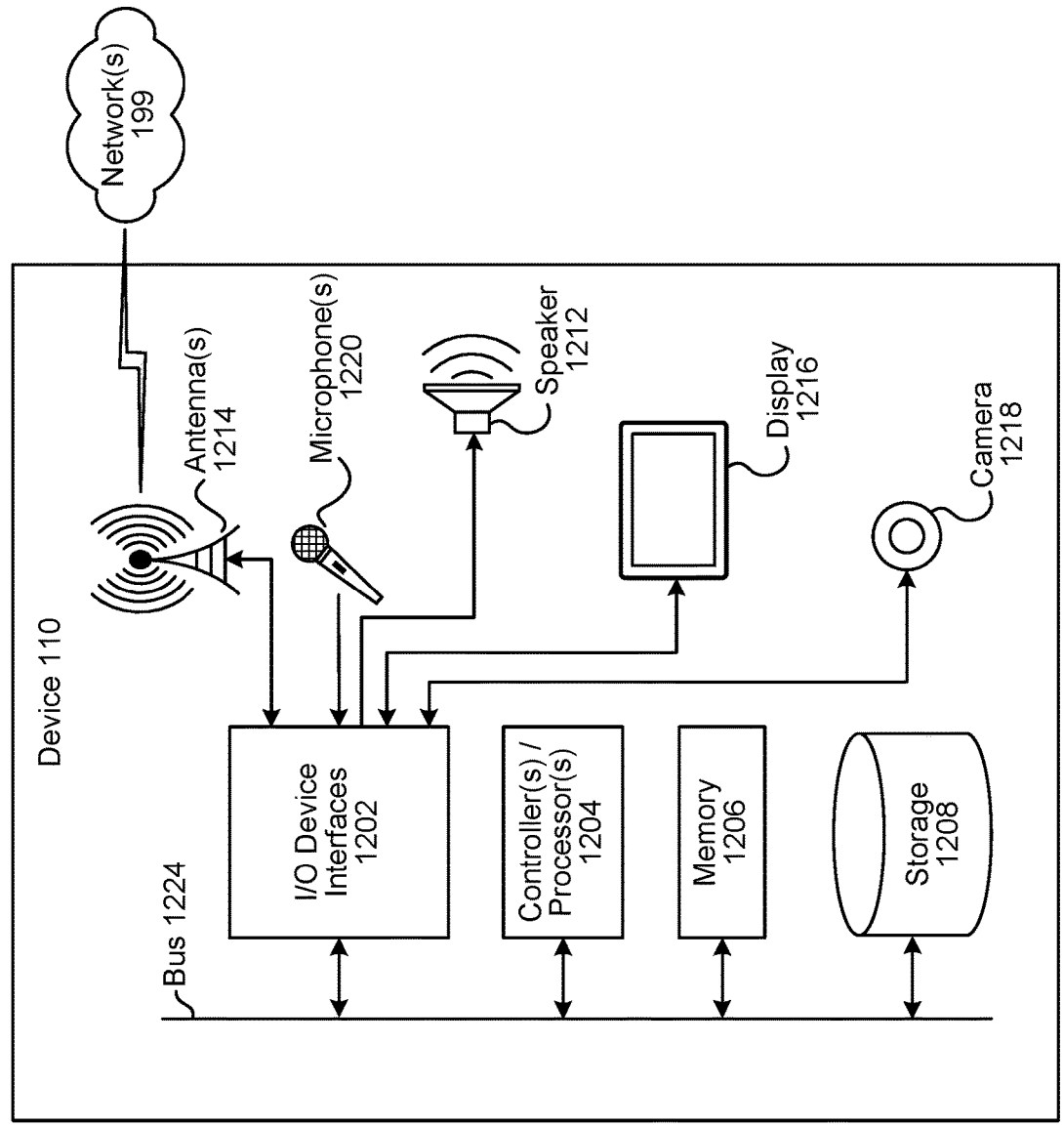
FIG. 12 is a block diagram conceptually illustrating example components of a device according to embodiments of the present disclosure.
Figure 13:
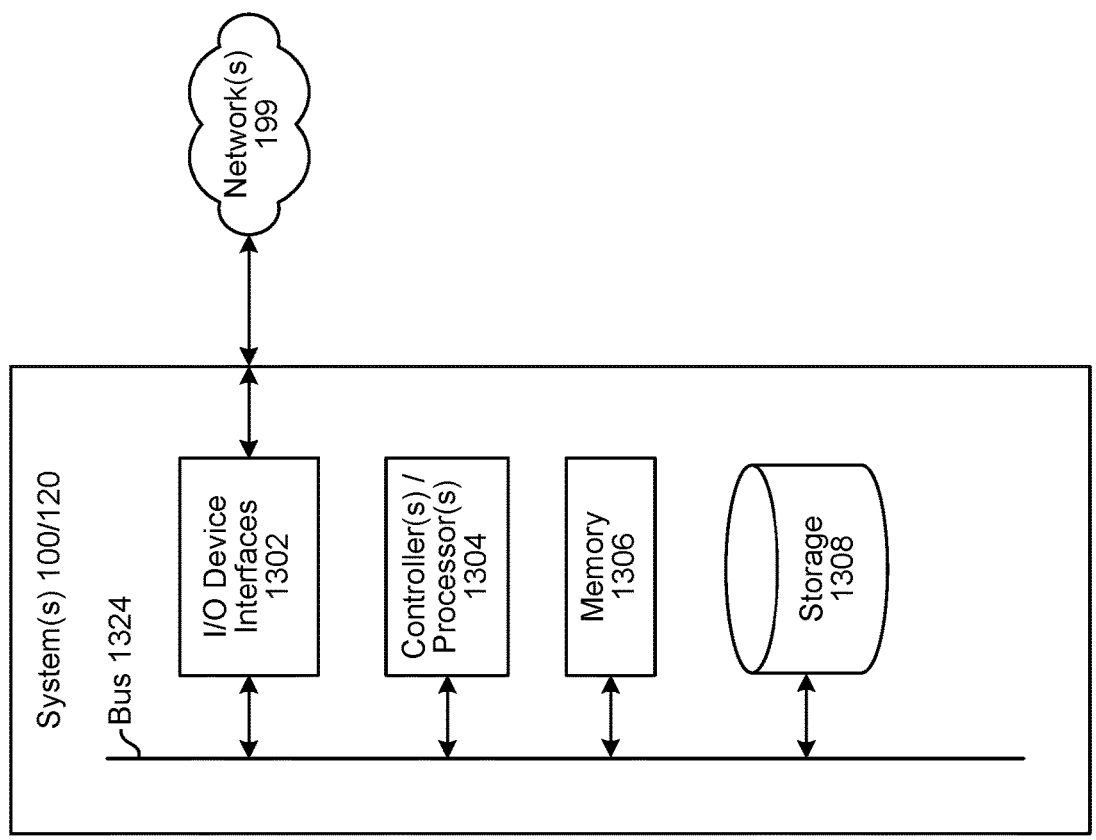
FIG. 13 is a block diagram conceptually illustrating example components of a server according to embodiments of the present disclosure.

FIG. 12 is a block diagram conceptually illustrating a device 110 that may be used with the system. FIG. 13 is a block diagram conceptually illustrating example components of a remote device, such as the system(s) 100/120, which may assist with ASR processing, NLU processing, etc., and the skill system(s) 225. A system (100/120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (100/120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/225) may also include a data storage component (1108/1208) for storing data and controller/processor-executable instructions. Each data storage component (1208/1308) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1202/1302).

Computer instructions for operating each device (110/120/225) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120/225) includes input/output device interfaces (1202/1302). A variety of components may be connected through the input/output device interfaces (1202/1302), as will be discussed further below. Additionally, each device (110/120/225) may include an address/data bus (1224/1324) for conveying data among components of the respective device. Each component within a device (110/120/225) may also be directly connected to other components in addition to (or instead of) being connected to other components across the bus (1224/1324).

Referring to FIG. 12, the device 110 may include input/output device interfaces 1202 that connect to a variety of components such as an audio output component such as a speaker 1212, a wired headset or a wireless headset (not illustrated), or other component capable of outputting audio. The device 110 may also include an audio capture component. The audio capture component may be, for example, a microphone 1220 or array of microphones 1220, a wired headset or a wireless headset (not illustrated), etc. If an array of microphones 1220 is included, approximate distance to a sound's point of origin may be determined by acoustic localization based on time and amplitude differences between sounds captured by different microphones of the array. The device 110 may additionally include a display 1216 for displaying content. The device 110 may further include a camera 1218.

Via antenna(s) 1214, the I/O device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interfaces (1202/1302) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1202/1302), processor(s) (1204/1304), memory (1206/1306), and/or storage (1208/1308) of the device(s) 110 system(s) 120, or the skill system(s) 225, respectively. Thus, the ASR component 250 may have its own I/O device interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 14:
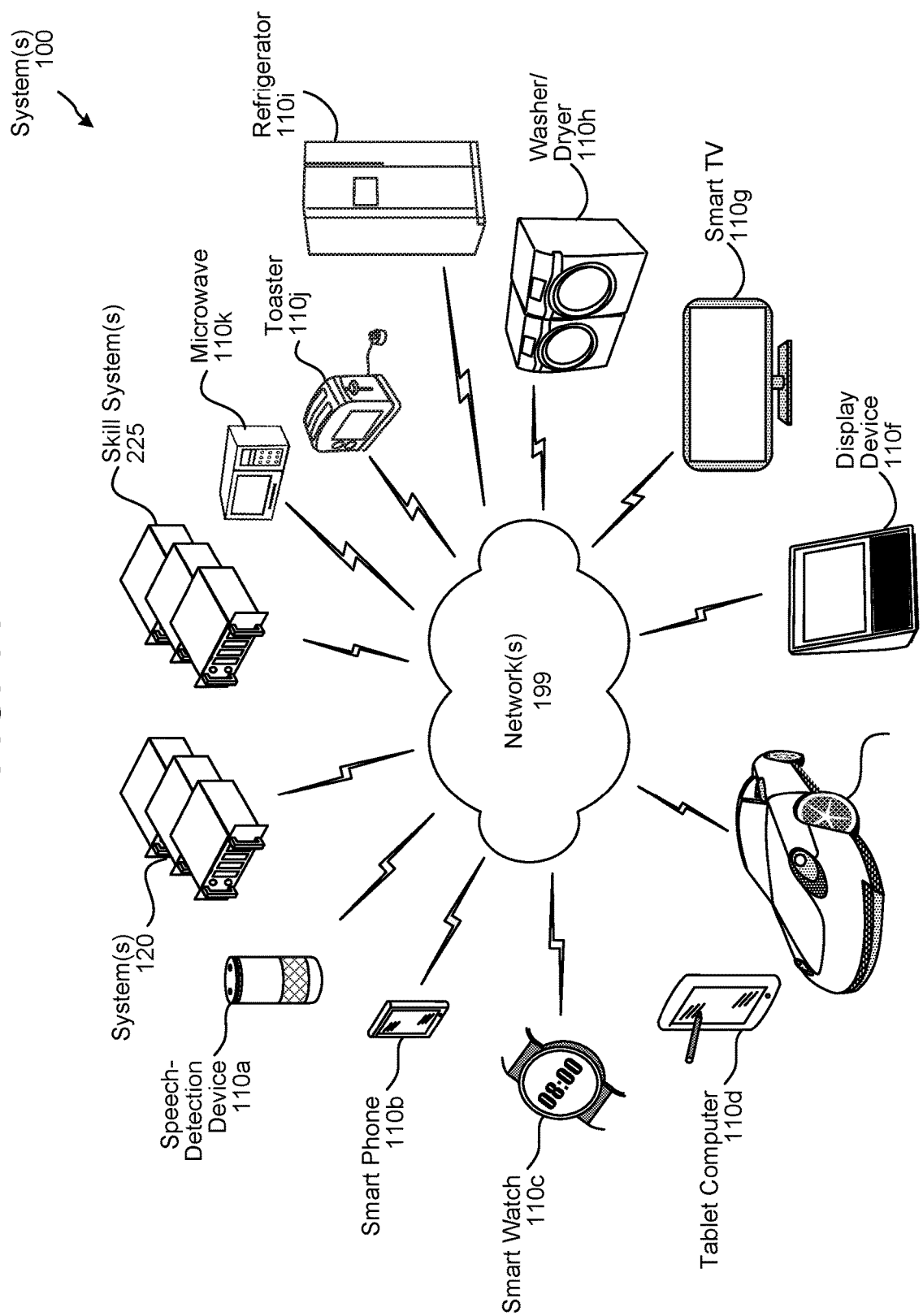
FIG. 14 illustrates an example of a computer network for use with the speech processing system.

As illustrated in FIG. 14, multiple devices (110a-110k, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, a toaster 110j, and/or a microwave 110k may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving audio data representing an utterance, the audio data comprising:
      a first set of audio frames representing a first word of the utterance,
      a second set of audio frames representing a second word of the utterance subsequent to the first word, and
      a third set of audio frames representing a third word of the utterance subsequent to the second word;
   processing the first set of audio frames using an acoustic model to generate first acoustic data;
   using a first language model having first model weights to process the first acoustic data to determine first text data corresponding to the first word of the utterance;
   processing the first text data using a trained classifier model to determine a first likelihood that the first word of the utterance corresponds to a first domain;
   determining that the first likelihood is below a threshold;
   processing the second set of audio frames using the acoustic model to generate second acoustic data;
   processing the second acoustic data using the first language model to determine second text data corresponding to the second word of the utterance;
   processing the second text data using the trained classifier model to determine a second likelihood that the second word of the utterance corresponds to a second domain;
   determining that the second likelihood is above the threshold;
   in response to determining the second likelihood is above the threshold, selecting second model weights corresponding to words associated with the second domain;
   determining an updated first language model using the first language model and the second model weights;
   processing the third set of audio frames using the acoustic model to generate third acoustic data; and
   processing the third acoustic data using the updated first language model to determine third text data corresponding to the third word of the utterance.

2. The computer-implemented method of claim 1, wherein processing the second text data comprises:
   determining a third likelihood that the second word of the utterance corresponds to a third domain, and
   wherein the method further comprises:
   determining that the third likelihood is above the threshold; and
   determining a second updated language model using the second model weights and third model weights corresponding to words associated with the third domain.

3. The computer-implemented method of claim 1, wherein the first language model is a finite state transducer (FST) for automatic speech recognition (ASR), the FST configured to be traversed using acoustic data and to output word sequences, and wherein the method further comprises:
   determining a set of word sequences corresponding to the second model weights, wherein a first weight of the second model weights corresponds to a first word sequence of the set of word sequences;
   determining a traversal path in the FST corresponding to the first word sequence; and
   determining the updated first language model by at least multiplying a second weight corresponding to the traversal path with the first weight.

4. The computer-implemented method of claim 1, wherein the audio data further comprises a fourth set of audio frames representing a fourth portion of the utterance subsequent to the third word and a fifth set of audio frames representing a fifth portion of the utterance subsequent to the fourth portion, and the method further comprises:
   processing the fourth set of audio frames using the acoustic model to generate fourth acoustic data;
   using the updated first language model to process the fourth acoustic data to determine fourth text data corresponding to the fourth portion;

processing the fourth text data using the trained classifier to determine a third likelihood that the utterance corresponds to a third domain;
determining that the third likelihood is above the threshold;
selecting third model weights corresponding to words associated with the third domain;
determining an additional updated first language model using the third model weights;
processing the fifth set of audio frames using the acoustic model to generate fifth acoustic data; and
processing the fifth acoustic data using the additional updated first language model to determine fifth text data corresponding to the fifth portion.

5. A computer-implemented method comprising:
receiving audio data representing an utterance, the audio data comprising:
  a first set of audio frames representing a first portion of the utterance, and
  a second set of audio frames representing a second portion of the utterance subsequent to the first portion;
processing the first set of audio frames using an acoustic model to generate first acoustic data;
using a first trained model having first model weights to process the first acoustic data to determine first text data corresponding to the first portion;
processing the first text data using a second trained model to determine first model output data indicating that the utterance corresponds to a first domain;
determining that the first model output data satisfies a condition;
in response to determining the first model output data satisfies the condition, determining an updated first trained model using the first trained model and second model weights corresponding to the first domain; and
processing the second set of audio frames using the updated first trained model to determine second text data corresponding to the second portion.

6. The computer-implemented method of claim 5, wherein processing the first text data using the second trained model comprises:
determining a second model output data indicating that the utterance corresponds to the second domain, and
wherein the method further comprises:
determining that the second model output data satisfies the condition; and
determining a second updated trained model using the second model weights and third model weights associated with the second domain.

7. The computer-implemented method of claim 5, wherein the first trained model is a finite state transducer (FST) for automatic speech recognition (ASR) and the first model weights is represented as at least a first data vector comprising:
a first weight corresponding to a first state of the FST, the first weight associated with the first domain, and
a second weight corresponding to the first state of the FST, the second weight associated with a second domain,
wherein the method further comprises:
processing the first text data using the second trained model to determine a second data vector comprising:
  the first model output data indicating the utterance corresponding to the first domain, and
  a second model output data indicating the utterance corresponding to the second domain, and
wherein determining the updated first trained model comprises multiplying the first data vector with the second data vector.

8. The computer-implemented method of claim 5, wherein the audio data further comprises a third set of audio frames corresponding to a third portion of the utterance and a fourth set of audio frames corresponding to a fourth portion of the utterance, and the method further comprises:
processing the third set of audio frames using the acoustic model to generate third acoustic data;
using the updated first trained model to process the third acoustic data to determine third text data corresponding to the third portion;
processing the third text data using the second trained model to determine a second model output data indicating that the utterance corresponds to a second domain;
determining that the second model output data satisfies the condition;
determining an additional updated first trained model using third model weights associated with the second domain;
processing the fourth set of audio frames using the acoustic model to generate fourth acoustic data; and
processing the fourth acoustic data using the additional updated first trained model to determine fourth text data corresponding to the fourth portion.

9. The computer-implemented method of claim 5, wherein the first set of audio frames occur prior to the second set of audio frames and the audio data comprises a third set of audio frames occurring after the second set of audio frames, and the method further comprises:
processing the third set of audio frames using the updated first trained model to determine third text data;
processing the third text data using the second trained model to determine a second model output data indicating a likelihood that the utterance corresponds to the first domain;
determining that the second model output data is satisfies the condition; and
generating automatic speech recognition (ASR) output data using at least the third text data.

10. The computer-implemented method of claim 5, wherein the first trained model is a finite state transducer (FST) for automatic speech recognition (ASR), the FST configured to be traversed using acoustic data and to output word sequences, and wherein the method further comprises:
determining a set of word sequences associated with the first domain;
determining third model weights corresponding to the set of word sequences, wherein a first weight of the third model weights corresponds to a first word sequence of the set of word sequences;
determining a traversal path in the FST corresponding to the first word sequence; and
determining the updated first trained model by at least multiplying a second weight corresponding to the traversal path with the first weight.

11. The computer-implemented method of claim 5, further comprising:
determining that the first set of audio frames represent a first word of the utterance; and
determining that the second set of audio frames represent a second word of the utterance.

12. The computer-implemented method of claim 5, wherein the first trained model is a finite state transducer (FST) for automatic speech recognition (ASR) and the first model weights is represented as at least a first data vector comprising at least:
  a first weight corresponding to a first state of the FST, the first weight associated with the first domain, and
  a second weight corresponding to the first state of the FST, the second weight associated with a second domain,
wherein determining the updated first trained model comprises:
  selecting the first weight based on the first model output data satisfying the condition; and
  discarding the second weight.

13. A system, comprising:
  at least one processor;
  a memory device including instructions operable to be executed by the at least one processor to configure the system to:
    receive audio data representing an utterance, the audio data comprising:
      a first set of audio frames representing a first portion of the utterance, and
      a second set of audio frames representing a second portion of the utterance subsequent to the first portion;
    process the first set of audio frames using an acoustic model to generate first acoustic data;
    use a first trained model having first model weights to process the first acoustic data to determine first text data corresponding to the first portion;
    process the first text data using a second trained model to determine first model output data indicating that the utterance corresponds to a first domain;
    determine that the first model output data satisfies a condition;
    in response to determining the first model output data satisfies the condition, determine an updated first trained model using the first trained model and second model weights corresponding to the first domain; and
    process the second set of audio frames using the updated first trained model to determine second text data corresponding to the second portion.

14. The system of claim 13, wherein the instructions to process the first text data, when executed by the at least one processor, further cause the system to:
  determine a second model output data indicating that the utterance corresponds to the second domain, and
wherein the instructions, when executed by the at least one processor, further cause the system to:
  determine that the second model output data satisfies the condition; and
  determine a second updated first trained model using the second model weights and third model weights associated with the second domain.

15. The system of claim 13, wherein the first trained model is a finite state transducer (FST) for automatic speech recognition (ASR) and the first model weights is represented as at least a first data vector comprising:
  a first weight corresponding to a first state of the FST, the first weight associated with the first domain, and
  a second weight corresponding to the first state of the FST, the second weight associated with a second domain,
wherein the instructions, when executed by the at least one processor, further cause the system to:
  process the first text data using the second trained model to determine a second data vector comprising:
    the first model output data indicating the utterance corresponding to the first domain, and
    a second model output data indicating the utterance corresponding to the second domain, and
wherein the instructions to determine the updated first trained model, further cause the system to multiply the first data vector with the second data vector.

16. The system of claim 13, wherein the audio data further comprises a third set of audio frames corresponding to a third portion of the utterance and a fourth set of audio frames corresponding to a fourth portion of the utterance, and the instructions, when executed by the at least one processor, further cause the system to:
  process the third set of audio frames using the acoustic model to generate third acoustic data;
  use the updated first trained model to process the third acoustic data to determine third text data corresponding to the third portion;
  process the third text data using the second trained model to determine a second model output data indicating that the utterance corresponds to a second domain;
  determine that the second model output data satisfies the condition;
  determine an additional updated first trained model using third model weights associated with the second domain;
  process the fourth set of audio frames using the acoustic model to generate fourth acoustic data; and
  process the fourth acoustic data using the additional updated first trained model to determine fourth text data corresponding to the fourth portion.

17. The system of claim 13, wherein the first set of audio frames occur prior to the second set of audio frames and the audio data comprises a third set of audio frames occurring after the second set of audio frames, and the instructions, when executed by the at least one processor, further cause the system to:
  process the third set of audio frames using the updated first trained model to determine third text data;
  process the third text data using the second trained model to determine a second model output data indicating a likelihood that the utterance corresponds to the first domain;
  determine that the second model output data satisfies the condition; and
  generate automatic speech recognition (ASR) output data using at least the third text data.

18. The system of claim 13, wherein the first trained model is a finite state transducer (FST) for automatic speech recognition (ASR), the FST configured to be traversed using acoustic data and to output word sequences, and the instructions, when executed by the at least one processor, further cause the system to:
  determine a set of word sequences associated with the first domain;
  determine third model weights corresponding to the set of word sequences, wherein a first weight of the third model weights corresponds to a first word sequence of the set of word sequences;
  determine a traversal path in the FST corresponding to the first word sequence; and
  determine the updated first trained model by at least multiplying a second weight corresponding to the traversal path with the first weight.

19. The system of claim 13, wherein the instructions, when executed by the at least one processor, further cause the system to:

determine that the first set of audio frames represent a first word of the utterance; and determine that the second set of audio frames represent a second word of the utterance.

20. The system of claim 13, wherein the first trained model is a finite state transducer (FST) for automatic speech recognition (ASR) and the first model weights is represented as at least a first data vector comprising at least:

a first weight corresponding to a first state of the FST, the first weight associated with the first domain, and a second weight corresponding to the first state of the FST, the second weight associated with a second domain, wherein the instructions to determine the updated first trained model, when executed by the at least one processor, further cause the system to:

select the first weight based on the first model output data satisfying the condition; and discard the second weight.

* * * * *